(12) United States Patent
Takeshita et al.

(10) Patent No.: US 6,778,333 B2
(45) Date of Patent: Aug. 17, 2004

(54) ZOOM LENS DEVICE

(75) Inventors: Yukitaka Takeshita, Asaka (JP); Yoji Naka, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 51 days.

(21) Appl. No.: 09/891,352

(22) Filed: Jun. 27, 2001

(65) Prior Publication Data

US 2002/0001139 A1 Jan. 3, 2002

(30) Foreign Application Priority Data

Jun. 28, 2000 (JP) .................................... 2000-194599
Jun. 28, 2000 (JP) .................................... 2000-194600

(51) Int. Cl.[7] ............................................. G02B 15/14
(52) U.S. Cl. ...................................... 359/698; 359/697
(58) Field of Search ................................. 359/697, 698

(56) References Cited

U.S. PATENT DOCUMENTS 4,550,993 A * 11/1985 Taniguchi et al. ............. 396/99
5,673,099 A * 9/1997 Haraguchi et al. .......... 396/379

FOREIGN PATENT DOCUMENTS

JP 11109436 A * 4/1999 ............ G03B/7/00

* cited by examiner

Primary Examiner—Ricky Mack
(74) Attorney, Agent, or Firm—Sughrue Mion, PLLC

(57) ABSTRACT

In a zoom lens device of the present invention, an aperture at a predetermined zooming step that is other than a telephoto end and a wide-angle end is smaller than apertures at the other zooming steps, and the predetermined zooming step is used only when a macro shooting mode is chosen. In the present invention, the predetermined zooming step between the telephoto end and the wide-angle end is set only for the macro shooting mode, and the aperture in the macro shooting mode is small enough to make the field depth large. Therefore, the simple and inexpensive lens device can perform the macro shooting.

6 Claims, 19 Drawing Sheets

F I G. 9
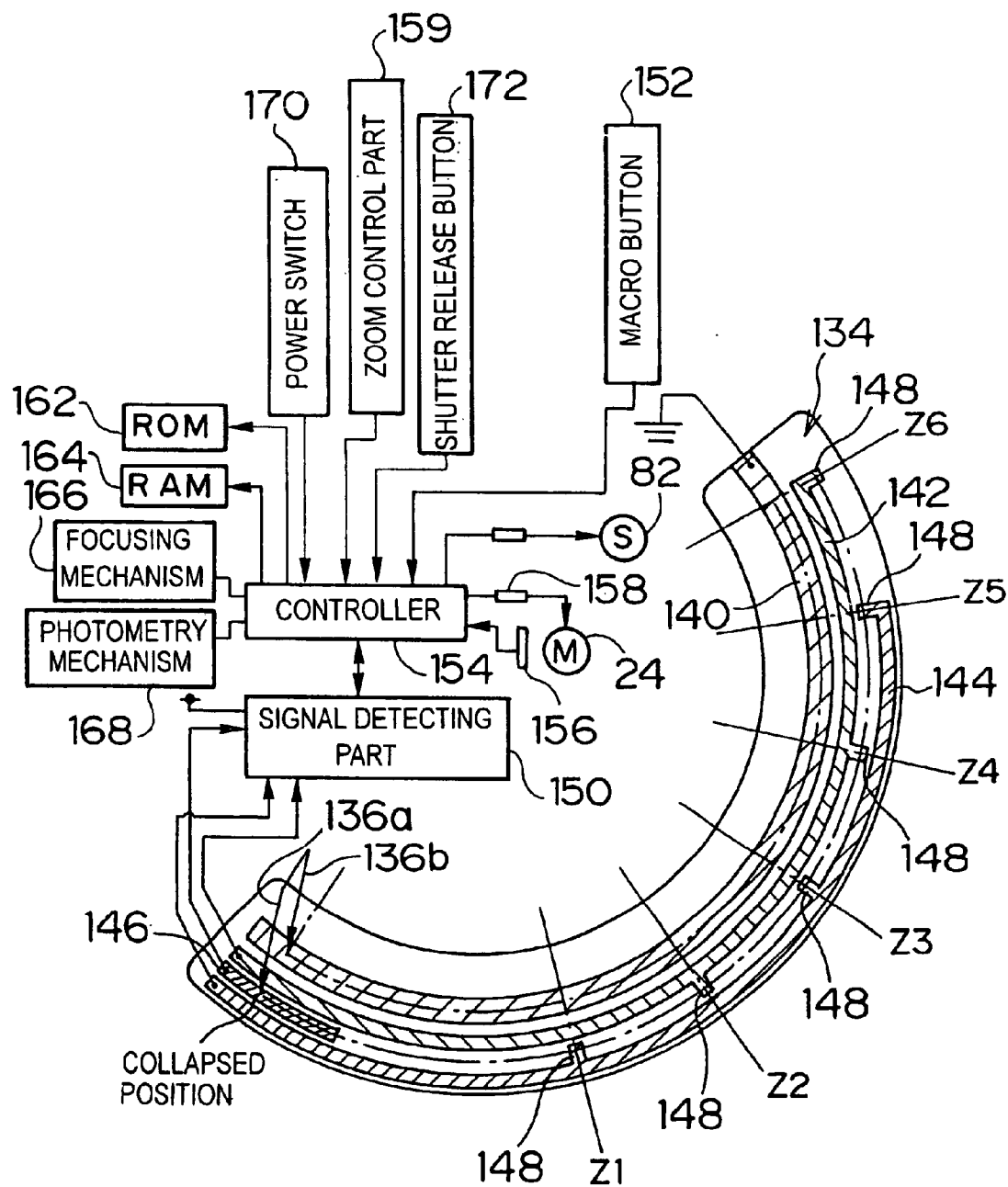

F I G. 1 9
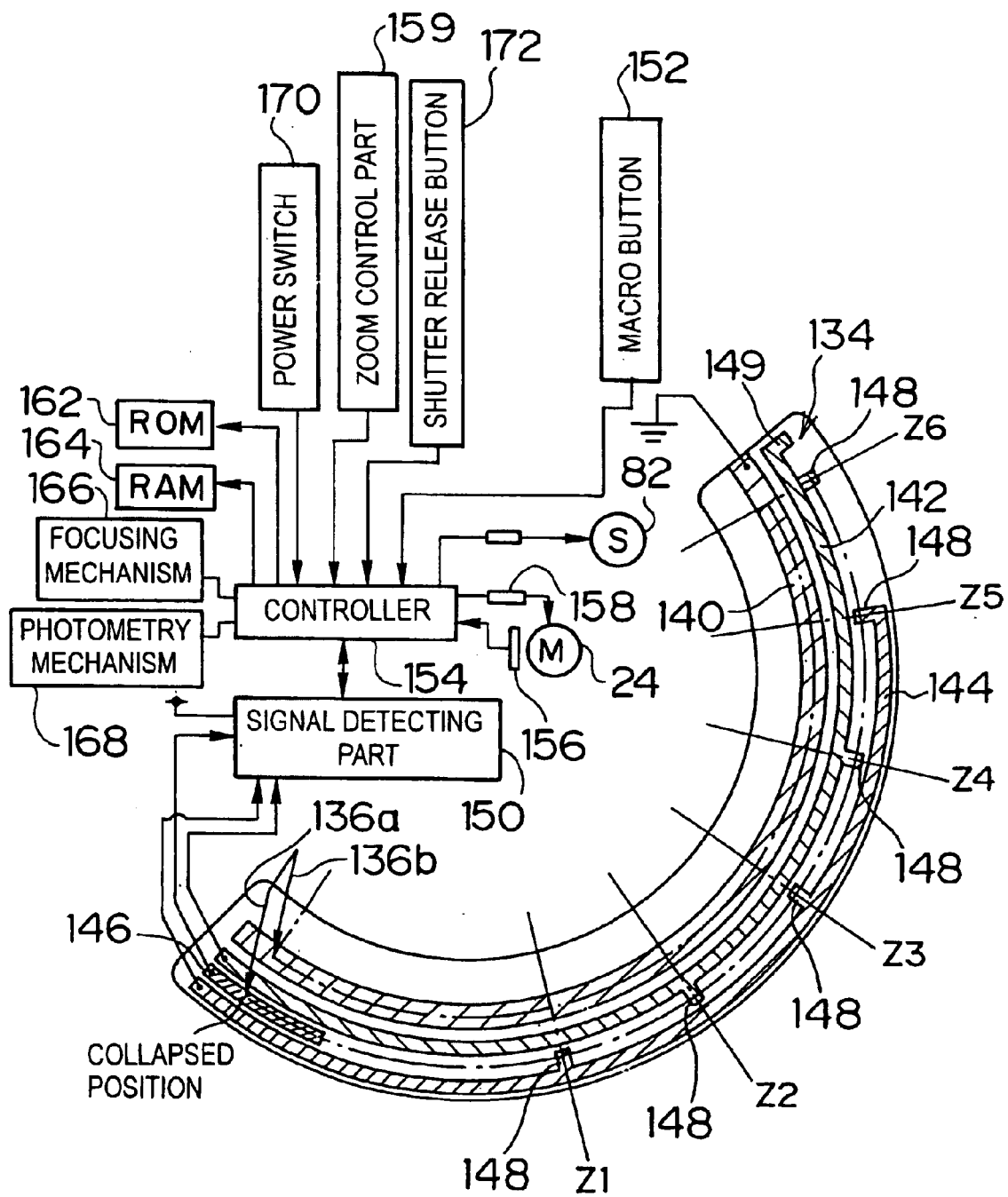

ZOOM LENS DEVICE

BACKGROUND OF THE INVENTION

1. Field of the Invention

The present invention relates generally to a zoom lens device, and more particularly to a simple inexpensive zoom lens device that can perform a macro shooting. The present invention relates generally to a zoom lens device, and more particularly to an inexpensive zoom lens device that can easily perform a macro shooting with a small aperture.

2. Description of the Related Art

In a conventional zoom lens device, when a normal shooting mode for shooting a subject with a normal subject distance is switched to a macro shooting mode, a zoom lens moves forward beyond a telephoto end and a focus lens moves.

When an aperture of sectors is small, in order to make a field depth larger for a macro shooting, a lens device can be focused on a depth-of-field subject and a precise automatic focus is not needed. When the normal shooting mode is switched to the macro shooting mode, the conventional zoom lens device stops sectors while they are opening to obtain a small aperture.

However, since the zoom lens moves forward beyond the telephoto end, the zoom lens device is large. To address this problem, if the telephoto end is used only for the macro shooting, a telephoto end for the normal shooting is close to the wide-angle end, and thus the zooming ratio is low.

For a short-distance shooting, the number of automatic focus needs to be increased because of a small field depth. Thus, the stop position of the lens needs to be precisely controlled, and this makes the lens device more expensive. To increase the field depth, a programmed shutter can be used with a small aperture. In this case, sectors need to be precisely controlled, this makes the lens device more expensive. Also, the shutter speed becomes fast, and the background is underexposed even if the main subject is appropriately exposed with an electronic flash.

Since the conventional zoom lens device controls the sectors with pulses, the structure and control of the sectors are complicated, and this makes the zoom lens device more expensive.

SUMMARY OF THE INVENTION

It is therefore an object of the present invention to provide a simple inexpensive zoom lens device that can perform a macro shooting.

It is therefore an object of the present invention to provide an inexpensive zoom lens device that can easily perform a macro shooting with a small aperture.

The above object can be achieved by providing a zoom lens device wherein an aperture at a predetermined zooming step that is between a telephoto end and a wide-angle end is smaller than apertures at the other zooming steps.

The above object can be achieved by providing a zoom lens device, comprising: a zoom lens with a plurality of zooming steps; a choosing device that chooses a macro shooting mode for obtaining a close-up of a subject; a driving device that moves the zoom lens to a predetermined zooming step that is between a telephoto end and a wide-angle end when the choosing device chooses the macro shooting mode; and an aperture restricting device that changes apertures according to the zooming steps so that an aperture at a predetermined zooming step that is between a telephoto end and a wide-angle end is smaller than apertures at the other zooming steps.

According to the present invention, the aperture at the predetermined zooming step that is between the telephoto end and the wide-angle end is smaller than apertures at the other zooming steps, and the predetermined zooming step is used only when the macro shooting mode is chosen. In the present invention, the predetermined zooming step between the telephoto end and the wide-angle end is set only for the macro shooting mode, and the aperture in the macro shooting mode is small to make the field depth large. Therefore, the lens does not have to be precisely controlled, and the simple lens device can preform the macro shooting. In addition, the lens device can be focused on a depth-of-field subject, and the automatic focus does not need to be precisely preformed. Also, the appropriate exposure can be obtained even if an electronic flash fully emits a light, and the electronic flash light does not need to be adjusted. Moreover, since the telephoto end is not only set for the macro shooting, the zooming ratio is high in the normal shooting.

Furthermore, since the predetermined zooming step is close to the telephoto side in which the view angle changes more largely than in the wide-angle side, the user does not realize the change of the view angle at the time of the normal shooting.

The above object can be achieved by providing a zoom lens device, comprising: a zoom lens; sectors that work as a diaphragm; and an aperture switching device that switches an aperture of the sectors when the zoom lens is moved beyond one of a telephoto end and a wide-angle end.

According to the present invention, when the zoom lens is moved beyond the telephoto end or the wide-angle end, the aperture switching device switches the aperture to a small aperture. This makes the field depth larger, and the lens device can be focused on a depth-of-field subject. Thus, the macro shooting can be easily performed.

Specifically, the zoom lens device comprises the zoom lens: the sectors that work as the diaphragm; an aperture restricting device composed of a cam follower and a cam member with a first cam surface, a second cam surface and a third cam surface; a pushing device that pushes the cam follower against the first cam surface and the second cam surface; and the aperture switching device. The cam member has a first cam surface that restricts the aperture according to the focal length of the zoom lens, a second cam surface that faces the first cam surface and restricts the aperture to the small aperture, and a third cam surface that is formed out of a range between the telephoto end and the wide-angle end and that guides the cam follower from the first cam surface to the second cam surface. The aperture switching device moves the zoom lens beyond the telephoto end or the wide-angle end to move the cam follower from the first cam surface to the second cam surface through the third cam surface and change the pushing direction of the pushing device from the direction of the first cam surface to the direction of the second cam surface.

When the zoom lens is moved beyond the telephoto end or the wide-angle end, the pushing device pushes the cam follower against the second cam surface, and the aperture is smaller than the other apertures. The lens device can obtain the small aperture only by moving the zoom lens beyond the telephoto end or the wide-angle end. Since the known aperture restriction needs little change to realize the aperture restriction of the present invention, the number of parts is not increased, and the lens device is small and inexpensive.

Since the macro shooting is performed with the small aperture, the exposure is appropriate even if the electronic flash fully emits the light. Thus, the electronic flash does not need to be adjusted. If a toggle mechanism is used as the pushing device, the one toggle mechanism can change the pushing direction.

The cam member has a fourth cam surface that guides the cam follower from the second cam surface to the first cam surface when the zoom lens is returned to a collapsed position. For example, if the fourth cam surface corresponds to the collapsed position, the small aperture for the macro shooting can be obtained at the zooming steps from the telephoto end to the wide-angle end. When the cam follower is returned to the first cam surface, the pushing direction of the cam follower is changed from the direction of the second cam surface to the direction of the first cam surface. This switches the macro shooting mode to the normal shooting mode.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 9 is an explanatory diagram showing the relation between the conductor patterns and the slider;

FIG. 19 is an explanatory diagram showing the relation between the conductor patterns and the slider;

DETAILED DESCRIPTION OF THE PREFERRED EMBODIMENTS

This invention will be described in further detail by way of example with reference to the accompanying drawings.

Figure 1:
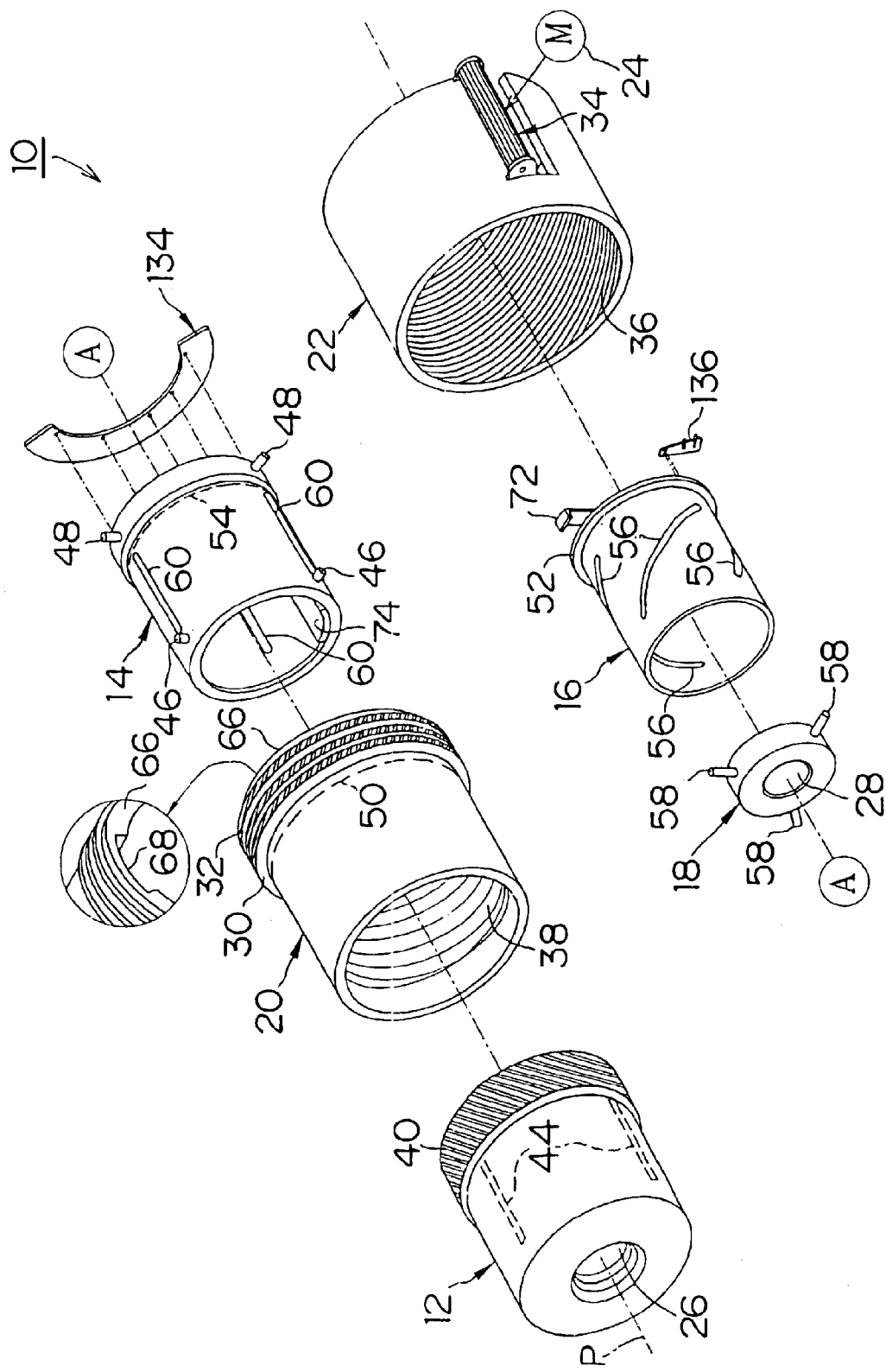
FIG. 1 is a disassembly perspective view of a zoom lens device.

A two-group zoom lens device 10 in FIG. 1 comprises a movable barrel 12, a guide barrel 14, a cam barrel 16, a lens frame 18, a rotatable barrel 20 and a fixed barrel 22.

Figure 2:
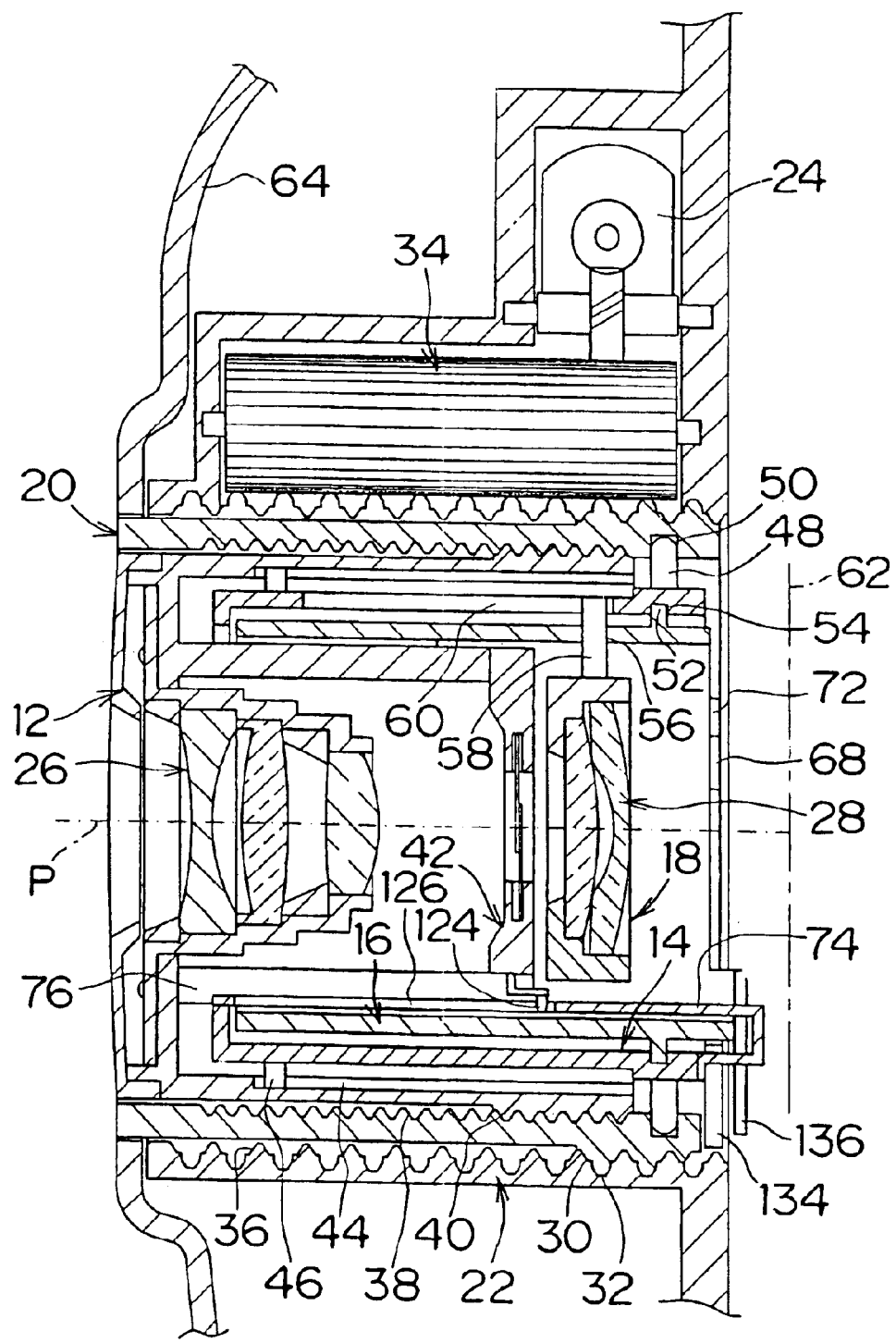
FIG. 2 is a cross section of the zoom lens device at a collapsed position.
Figure 3:
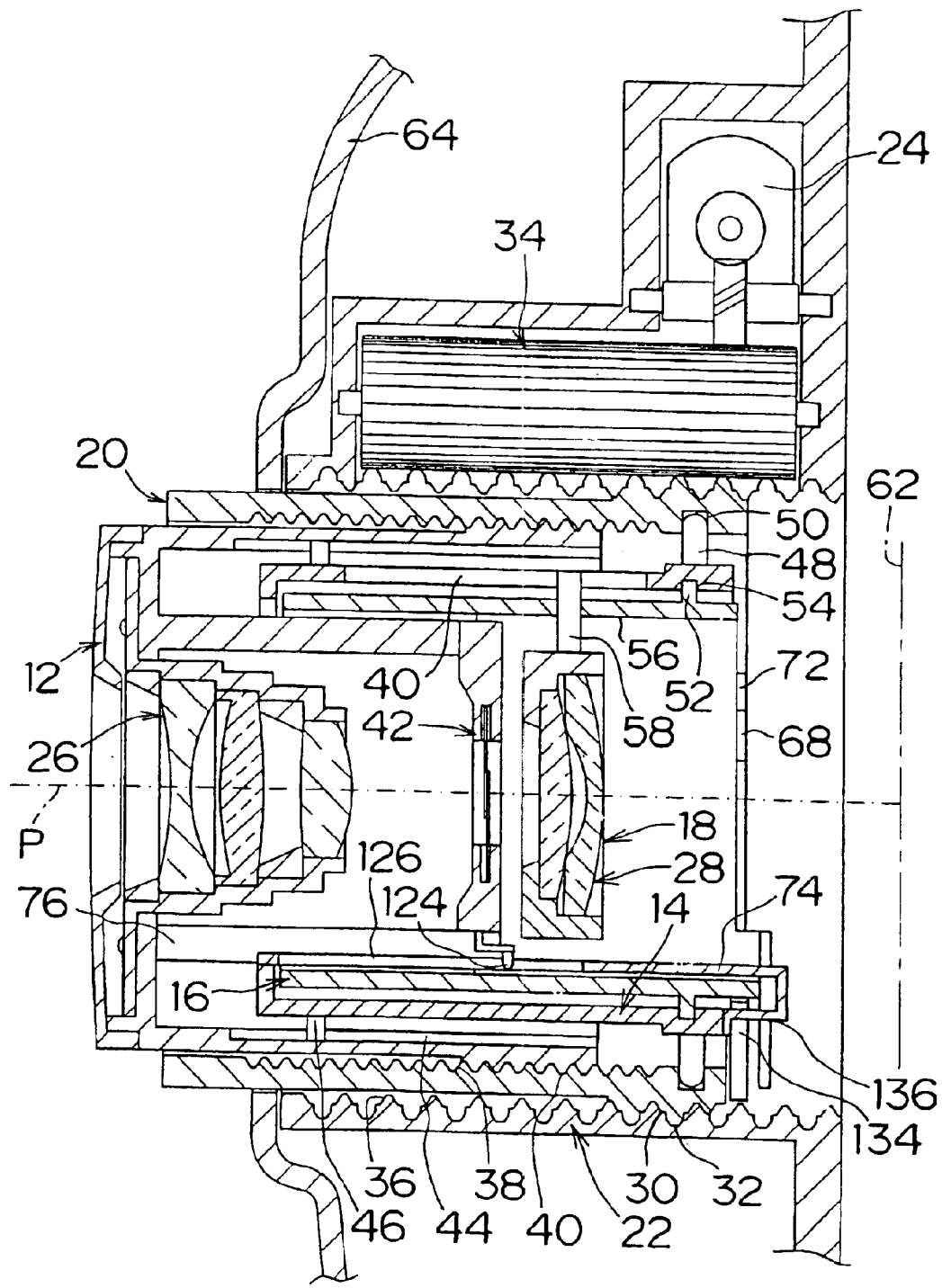
FIG. 3 is a cross section of the zoom lens device at a wide-angle position.
Figure 4:
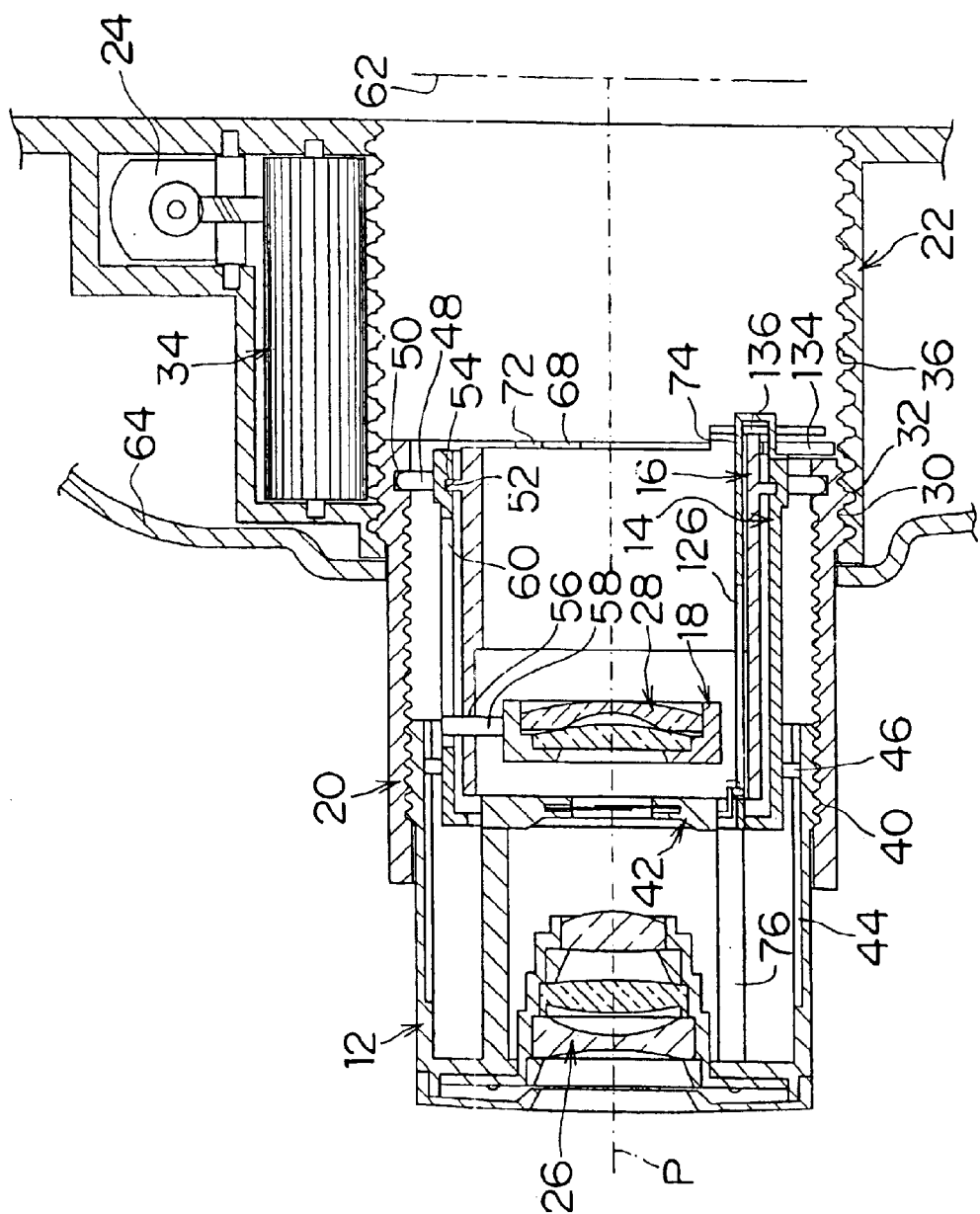
FIG. 4 is a cross section of the zoom lens device at a telephoto position.

The zoom lens device 10 rotates the rotatable barrel 20 by a motor (driving device) 24 to move a front lens group 26 and a back lens group 28 shown in FIGS. 2, 3 and 4 along an optical axis P. This zooms and focuses the lens groups 26 and 28 on a subject.

Threads 30 are formed on the outer periphery of the rotatable barrel 20, and a gear part 32 is formed between the threads 30. Driving force of the motor 24 is transmitted to the gear part 32 through a gear 34. The threads 30 are engaged with threads 36 formed on the inner periphery of the fixed barrel 22. The rotatable barrel 20 is rotated and moved along the optical axis P with respect to the fixed barrel 22 by the threads 30 and 36. Threads 38 are formed on the inner periphery of the rotatable barrel 20, and engaged with threads 40 formed on the outer periphery of the movable barrel 12.

As shown in FIG. 2, the front lens group 26 and a lens shutter 42 are fixed to the movable barrel 12. Guide grooves are formed on the inner periphery of the movable barrel 12 along the optical axis P, and are coupled to first guide couplers 46 provided on the outer periphery of the guide barrel 14 as shown in FIG. 1. Thus, the movable barrel 12 is moved along the optical axis P with respect to the rotatable barrel 20 by the rotatable barrel 20 and the guide barrel 14.

Second couplers 48 are provided on the outer periphery of the guide barrel 14 as shown in FIG. 1, and are rotatably coupled with a circular groove 50 formed on the inner periphery of the rotatable barrel 20 about the optical axis P. The guide barrel 14 moves along the optical axis P with the rotatable barrel 20 without rotating.

A flange 52 is formed on the back end of the cam barrel 16, and is rotatably coupled with a circular groove 54 formed on the inner periphery of the guide barrel 14. Cam slits 56 are formed in the cam barrel 16, and are coupled with cam followers 58 projecting from the lens frame 18. The cam followers 58 are coupled with guide slits 60 formed in the guide barrel 14 along the optical axis P through the cam slits 56. The cam slits 56, the cam followers 58 and the guide slits 60 are provided or formed at regular intervals. Reference numerals 62 and 64 in FIGS. 2–4 denote a film and a front cover, respectively.

Figure 5:
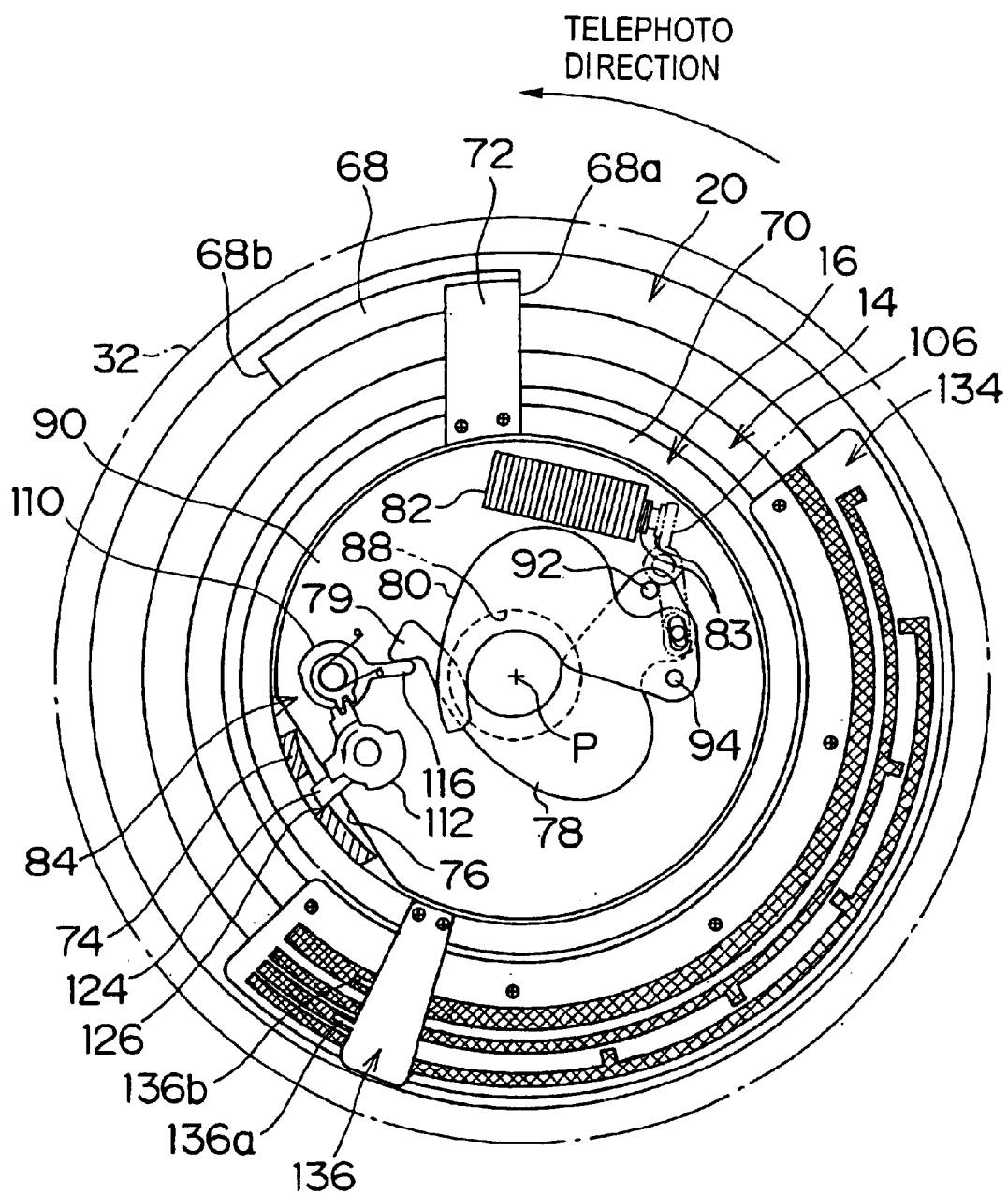
FIG. 5 is an explanatory view showing a relation between a cut and an arm and a relation between conductor patterns and a slider.

A cut 68 is formed on a back end 66 of the rotatable barrel 20 in FIG. 1, and the end of an L-shaped arm 72 provided on a back end 70 of the cam barrel 16 is loosely coupled with the cut 68. During the zooming, the motor 24 rotates only the rotatable barrel 20, and then rotates the cam barrel 16 as one of two sides of the cut 68 pushes the arm 72. During the focusing, the motor 24 rotates only the rotatable barrel 20. An arrow in FIG. 5 shows the rotation direction of the rotatable barrel 20 for telephoto.

As one of the sides 68a and 68b of the cut 68 pushes the arm 72, the cam barrel 16 is rotated with respect to the guide barrel 14 by the rotatable barrel 20. As shown in FIG. 5, the side 68a pushes the arm 72 when the rotatable barrel 20 rotates for the telephoto, and the side 68b pushes the arm 72 when the rotatable barrel 20 rotates for wide-angle. The lens frame 18 supports the back lens group 28.

During the zooming, since the cam barrel 16 rotates with the rotatable barrel 20, the front lens group 26 is moved along the optical axis P by the rotatable barrel 20 and the movable barrel 12, and the back lens group 28 is moved along the optical axis P by the rotatable barrel 20 and the cam slits 56. During the focusing, since the cam barrel 16 does not rotate, the front lens group 26 is moved along the optical axis P by the rotatable barrel 20 and the movable barrel 12, and the back lens group 28 is moved along the optical axis P by the rotatable barrel 20.

A cam plate 74 (a part of an aperture restricting device) is attached to the inner periphery of the guide barrel 14 which moves along the optical axis P with the rotatable barrel 20 during the zooming. The cam plate 74 is moved within a cut 76 formed outside the lens shutter 42 by the guide barrel 14.

Figure 6:
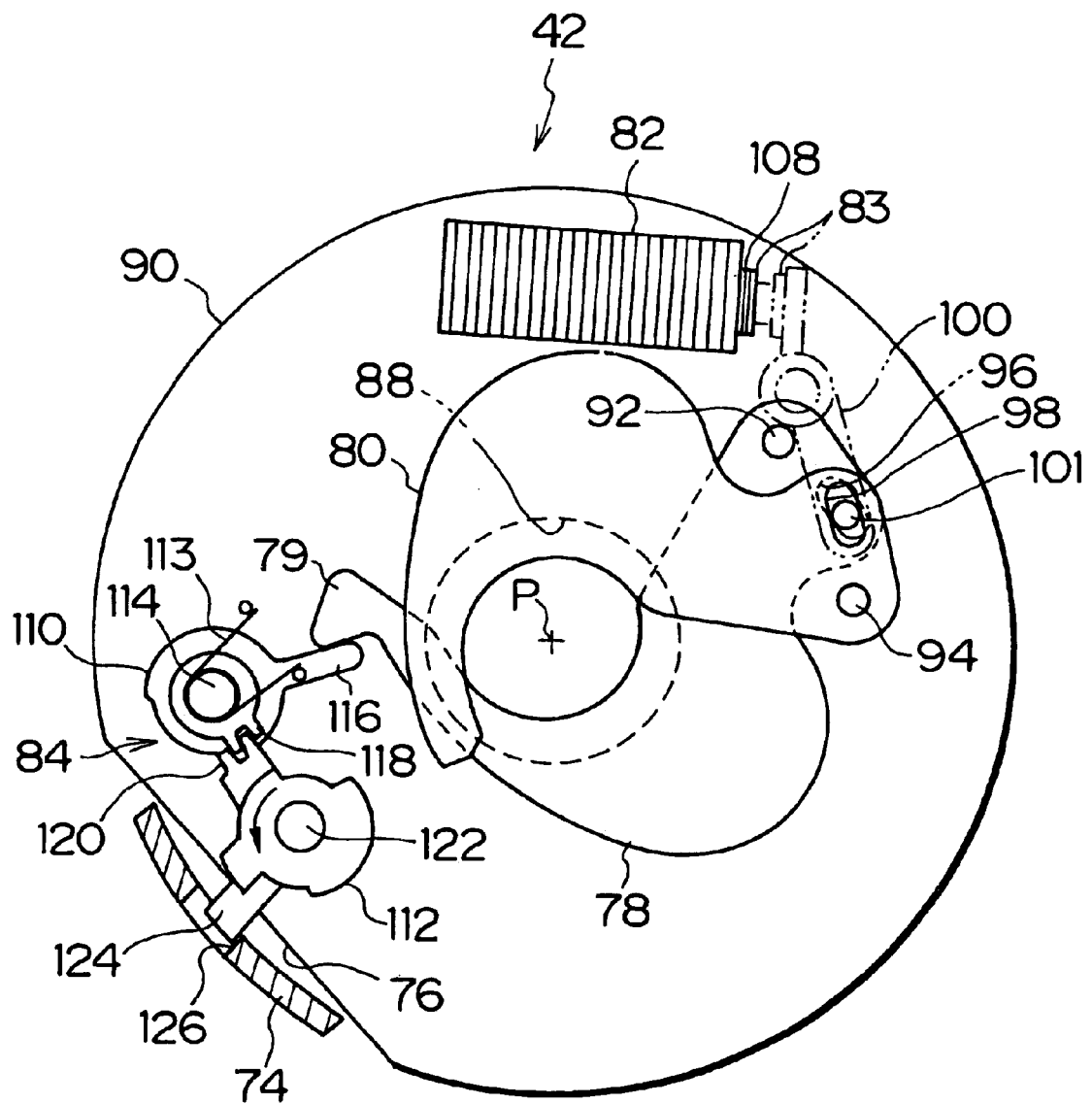
FIG. 6 is a view showing a lens shutter.

As shown in FIG. 6, the lens shutter 42 has two sectors 78 and 80, a direct-acting solenoid 82, an aperture restricting member 84 coupled with the cam plate 74, and so on. These are attached to a shutter plate 90 with a shutter opening 88. The cam plate 74 and the aperture restricting member 84 compose the aperture restricting device.

Figure 7:
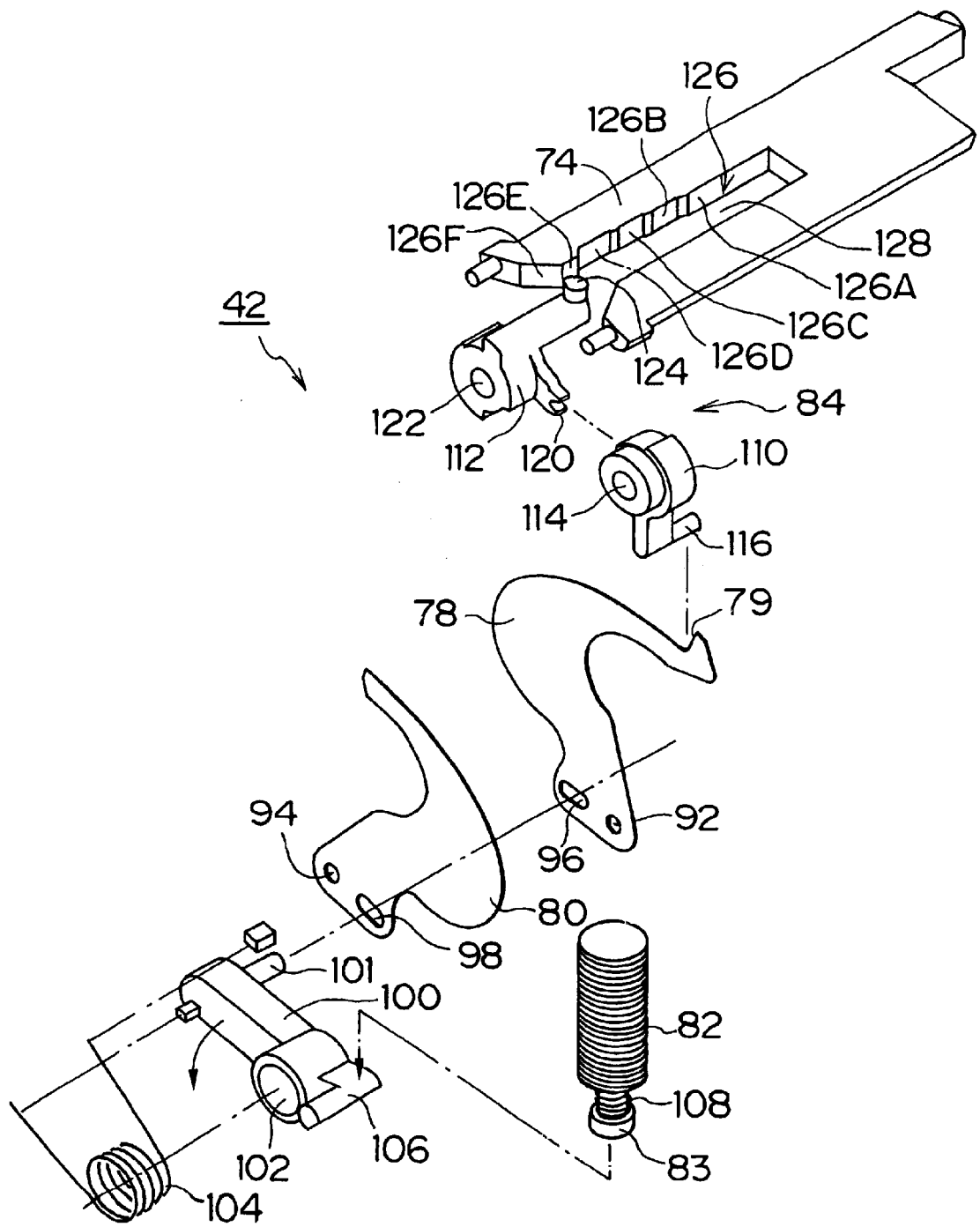
FIG. 7 is a disassembly perspective view of the lens shutter.

The sectors 78 and 80 are rotatably supported by the shutter plate 90 through holes 92 and 94. Slots 96 and 98 are formed in the sectors 78 and 80 near the holes 92 and 94, respectively, as shown in FIG. 7, and a pin 101 of a lever 100 is coupled with the slots 96 and 98. The lever 100 is rotatably supported by the shutter plate 90 through a shaft 102, and is pushed counterclockwise in FIG. 7 about the shaft 102 by a spring 104 hooked on the lever 100 and the shutter plate 90. When the lever 100 is rotated counterclockwise, the sectors 78 and 80 rotates from closed positions for closing the shutter opening 88 (see FIG. 6) to open positions about the holes 92 and 94 by being pushed by the pin 101. This opens the lens shutter 42.

A contact 106 is formed on the other side of the shaft 102 of the lever 100 as shown in FIG. 7, and a core 83 is in contact with the contact 106. The core 83 is pushed downward in FIG. 7 by a spring 108 between the solenoid 82 and the core 83 to push the contact 106. This restricts the rotation of the lever 100, and thus keeps the sectors 78 and 80 at the closed positions. The solenoid 82, the core 83 and the spring 108 compose a plunger.

When a current flows to the solenoid 82, the core 83 moves to the left in FIG. 6 to enter in the cylinder-shaped solenoid 82. This relieves the sectors 78 and 80 of the restriction so that they rotate toward the open positions to positions corresponding to the maximum aperture.

The aperture restricting member 84 limits the aperture with the cam plate 74, and it is composed of a restriction lever 110 and a cam lever 112.

The restriction lever 110 is rotatably supported by the shutter plate 90 through a shaft 114, and it has a lever part 116 that is in contact with a contact 79 at the end of the sector 78. This restricts the rotation of the sector 78 and the rotation of the lever 100, and thus restricts the rotation of the sector 80. The aperture is limited in this way.

The restriction lever 110 also has a gear part 118 as shown in FIG. 6, and the gear part 118 is engaged with a gear part 120 of a cam lever 112 which is rotatably supported by a shutter plate 90 through a shaft 122. A spring 113 pushes the cam lever 112 counterclockwise in FIG. 6 through a restriction lever 110, and thus a cam pin 124 of the cam lever 112 pushes a cam surface 126 of the cam plate 74. Thus, when the cam pin 124 moves with respect to the cam surface 126, the cam lever 112 and the restriction lever 110 are rotated to move the lever part 116. This changes the maximum aperture.

As shown in FIG. 5, the cam plate 74 is fixed to the guide barrel 14 so that it moves in the cut 76 in the cam barrel 16. The cam pin 124 is coupled with the cam surface 126 when the zoom lens device 10 is within the range between a collapsed position and a macro shooting position, and it is not when the zoom lens device 10 is at a telephoto position out of the range (see FIG. 8). The collapsible zoom lens device 10 is explained in the embodiment, but this invention is not limited to that.

The cam surface 126 is formed on one side of a cam slit 128 along the optical axis P, and is composed of cam surfaces 126A, 126B, 126C, 126D, 126E and 126F corresponding to six zooming steps Z1, Z2, Z3, Z4, Z5 and Z6.

The cam surfaces 126A–126F push the cam pin 124 more softly from the cam surface 126A to the cam surface 126F, excluding the cam surface 126E corresponding to the zooming step Z5 for the macro shooting. Thus, the maximum aperture becomes larger as the zoom lens device 10 moves from a wide-angle end to a telephoto end.

The maximum aperture at the zooming step Z5 is smaller than those at the other zooming steps, and thus a field depth at the zooming step Z5 is larger than those at the other zooming steps. Therefore, the macro shooting that does not require precise control of the lens positions is possible at the zooming step Z5.

As shown in FIG. 5, a pattern member 134 is attached to the back end of the guide barrel 14, and a slider 136 is attached to the back end 70 of the cam barrel 16. The slider 136 has two brushes 136a and 136b that slide along the pattern member 134 as shown in FIG. 9. The pattern member 134 has a ground pattern 140, a first pattern 142, a second pattern 144 and a collapsed position pattern 146. The brushes 136a and 136b are electrically connected. The ground pattern 140 is grounded, and is ark-shaped so that the brush 136b slides along it when cam barrel 16 rotates while the zoom lens device 10 is within the range between the collapsed position and the telephoto end.

Predetermined voltages are applied to the first pattern 142 and the second pattern 144 from a signal detecting part 150, and signal parts 148 are provided at positions where the brush 136a is at the zooming steps Z1–Z6. The second, fourth and sixth (even-numbered) signal parts 148 are provided on the first pattern 142, and the first, third and fifth (odd-numbered) signal parts 148 are provided on the second pattern 144. The brush 136a is on the sixth signal part 148 at the zooming step Z6 for the telephoto, and it is on the fifth signal part 148 at the zooming step Z5 for the macro shooting.

Figure 8:
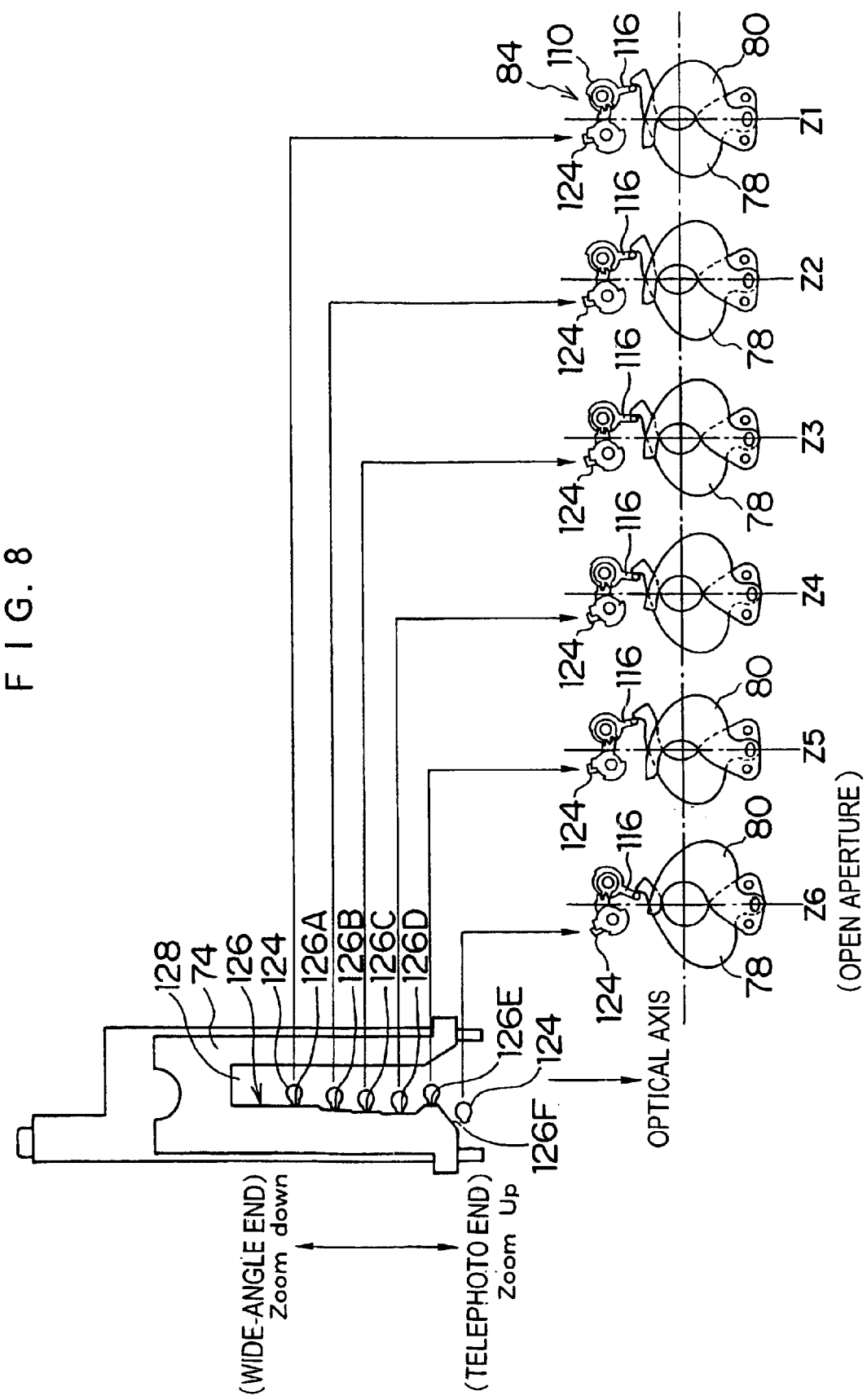
FIG. 8 is an explanatory diagram showing apertures at zooming steps.

The fifth signal part 148 is not used in a normal shooting mode, and the brush 136a is automatically moved to that when a macro shooting mode is chosen by a macro button 152. The aperture at the zooming step Z5 is smaller than those at the other zooming steps as shown in FIG. 8, and thus the field depth at the zooming step Z5 is larger than those at the other zooming steps.

The collapsed position pattern 146 itself is a signal part. When the zoom lens device 10 is at the collapsed position, the brush 136a is on it, and the collapsed position pattern 146 outputs a "0" (low level) signal to the signal detecting part 150. When the brush 136a is not on it, it outputs a "1" (high level) signal.

Also, when the brush 136a is on one of the even-numbered signal parts 148, the first pattern 142 outputs a "0" (low level) signal to the signal detecting part 150; and when the brush 136a is on none of the three parts 148, the first pattern 142 outputs a "1" (high level) signal. When the brush 136a is on one of the odd-numbered signal parts 148, the second pattern 144 outputs a "0" (low level) signal to the signal detecting part 150; and when the brush 136a is on none of the three parts 148, the second pattern 144 outputs a "1" (high level) signal. The signal outputted from the first pattern 142 is called a signal A, and the signal outputted from the second pattern 144 is called a signal B, and the signal outputted from the collapsed position pattern 146 is a signal Hp. The change of each signal from the high level to the low level is called a fall, and the opposite change is called a rise.

The signal detecting part 150 outputs the signals A, B and Hp to a controller 154 connected to the motor 24 for the zooming through a driver 158. A rotary encoder 156 is provided on an output shaft of the motor 24, and the rotary encoder 156 determines a rotation angle of the motor 24 and feeds it back to the controller 154, which controls the motor 24 according to the rotation angle.

The controller 154 drives the motor 24 in response to an operation of a zoom button of a zoom control part 159. The zoom button is composed of a telephoto button for moving the zoom lens device 10 toward the telephoto end and a wide-angle button for moving it toward the wide-angle end.

The controller 154 is connected to a ROM 162, a RAM 164, the macro button 152 and so on. The ROM 162 records opening and closing times of the sectors 78 and 80 and a moving amount of the front lens group 26 for each combination of a zooming position and a subject brightness, and programs for controlling the camera. The RAM 164 temporarily records a subject distance obtained from a focusing mechanism 166, a subject brightness obtained from the photometry mechanism 168, the opening and closing times of the sectors 78 and 80 read from the ROM 162, and so on.

The programs include a zooming program for moving the zoom lens device 10 to the zooming position according to zooming operation, a focusing program for moving it from the zooming position to a focusing position after the shutter release, a returning program for returning it to the zooming position after the exposure, an error correction program for detecting that the cam barrel 16 has made an error of rotation angle and returning the zoom lens device 10 to the zooming position in case of the error, and a macro program for moving the zoom lens device 10 to the zooming step Z5 when the macro shooting is selected with the macro button 152.

The controller 154 detects the falls of the signals A and B at the zooming to determine which of the zooming steps Z1–Z6 the zooming position is. The zooming position is rewritten in the RAM 164 each time it is changed.

The zooming program has a flow for each of the two cases; a case in which the signal part 148 corresponding to the previous zooming position is even-numbered (the signal A) and a case in which it is odd-numbered (the signal B).

The focusing program has a flow for each of the two cases; a case in which the signal part 148 corresponding to the current zooming position is even-numbered (the signal A) and a case in which it is odd-numbered (the signal B).

Since the brush 136a is not on the zooming signal part 148 of the first or second pattern 142 or 144 after the focusing, the returning program returns the brush 136a to the signal part 148. The returning program has a flow for each of the two cases; a case in which the signal part 148 is even-numbered (the signal A) and a case in which it is odd-numbered (the signal B).

The error correction program is executed at each predetermined time while operations such as the zooming, the focusing, the exposure and the film feeding are not being performed.

During that time, the brush 136a is on none of the signal parts 148. The cam barrel 16 can make an error of rotation angle due to disturbance.

Therefore, the program reads the signals A and B to determine whether the cam barrel 16 has made the error. If so, the program drives the motor 24 to return the brush 136a to the zooming signal part 148. The program has a flow for each of the two cases; a case in which the zooming signal part 148 is even-numbered (the signal A) and a case in which it is odd-numbered (the signal B).

The macro program controls the motor 24 to move the cam barrel 16 so that the brush 136a is on the fifth signal part 148 for the macro shooting. If the user is to take a picture even when the focusing mechanism 166 (see FIG. 9) has detected that the subject is out of a macro shooting range in the macro shooting mode, the controller 154 controls the motor 24 for a zooming step other than the fifth zooming step Z5. Preferably, the brush 136a is moved to the fourth signal part 148 for the fourth zooming step Z4.

Even if the automatic focusing determines that the subject is out of the macro shooting range, the lens is focused on a point within the macro shooting range. Preferably, the lens is focused on the middle of the macro shooting range.

The macro shooting range is determined in the following way. The electronic flash light does not go far enough because the aperture is small at the zooming step Z5, and the natural light is not enough in case of an ordinary film sensitivity. For this reason, the macro shooting range is the range of the electronic flash light. A range where the back lens group 28 moves on a locus D (see FIG. 11) for the focusing is determined from a rotation area where the rotatable barrel 20 rotates without pushing the arm 72 of the cam barrel 16. Therefore, if the back lens group 28 can not move very much for the focusing due to the rotation area, the macro shooting range needs to be limited.

The controller 154 controls the motor 24 so that the zoom lens device 10 moves from the collapsed position to the wide-angle position in response to a turning-ON of the power switch 170. The controller 154 stops the motor 24 when it detects a fall of the signal A. At this time, the brush 136a is on the first signal part 148 of the second pattern 144, and the arm 72 is in contact with the side 68a of the cut 68 of the rotatable barrel 20 as shown in FIG. 5.

Since the position of the lens at a zooming position differs from direction to direction of the lens movement due to the rotation angle, the program makes the arm 72 be in contact with the side 68a of the cut 68 when the brush 136a is on a signal part 148 of the first pattern 142 or the second pattern 144.

Since the moving amounts of the lens groups 26 and 28 differ from zooming position to zooming position at the focusing even if the subject distance is the same, motor driving pulses corresponding to a lens moving amount for each subject distance is stored in the ROM 162. The motor driving pulses rotates the cam barrel 16 within the rotation area.

The operation of the zoom lens device 10 will now be explained with reference to the figures. The zoom lens device 10 is initially at the collapsed position as shown in FIG. 2, and the brush 136a is on the collapsed position pattern 146. The user can not take a picture while the zoom lens device 10 moves from the collapsed position to the wide-angle position. The cam surface 126A corresponding to the period is flat as shown in FIG. 8.

The controller 154 controls the motor 24 in response to a turning-ON of the power switch 170. The driving force of the motor 24 is transmitted to the rotatable barrel 20, which is moved along the optical axis P with respect to the fixed barrel 22 by the threads 30 and 36. Then, the movable barrel 12 is moved along the optical axis P with respect to the rotatable barrel 20 by the threads 38 and 40. This moves the front lens group 26 along the optical axis P.

The guide barrel 14, the cam barrel 16 and the lens frame 18 move along the optical axis P with the rotatable barrel 20. The rotation force of the rotatable barrel 20 is transmitted to the cam barrel 16 as the side 68a pushes the arm 72. The lens frame 18 is moved along the optical axis P with respect to the rotatable barrel 20 by the cam slits 56 as the cam barrel 16 rotates in the rotatable barrel 20. This changes the distance between the front lens group 26 and the back lens group 28.

The rotation of the cam barrel 16 slides the slider 136 along the ground pattern 140 and the signal parts 148 provided on the guide barrel 14. The controller 154 stops the motor 24 when it detects the first fall of the signal B. At this time, the brush 136a is on the first signal part 148 of the second pattern 144, and the controller 154 determines that the lens device 10 is at the wide-angle end and records the information in the RAM 164. This makes it possible to cancel a zooming operation toward the wide-angle end since the lens device 10 is already at the wide-angle end.

During the zooming toward the wide-angle end, the cam pin 124 of the aperture restricting member 84 slides along the cam surface 126. The cam pin 124 is on the cam surface 126A when the lens device 10 is at the wide-angle end.

If a zooming operation toward the telephoto end is performed after the power is turned ON, the controller 154 executes the program for the telephoto.

Each time the brush 136a passes one of the signal parts 148 for the zooming steps Z2–Z6, the controller 154 detects a fall and a rise of the signal A or B and rewrites the information stored in the RAM 164. Thus, in response to an operation of the zoom control part 159, the controller 154 reads the information on the zooming step stored in the RAM 164 and determines whether to monitor the signal A or the signal B according to the number of the signal part 148 corresponding to the zooming step.

In case of the zooming step Z2, the controller 154 stops the motor 24 when it detects a fall of the signal B. At this time, the brush 136a is on the signal part Z3 of the second pattern 144, and the arm 72 is in contact with the side 68a of the cut 68.

If a zooming operation toward the wide-angle end is performed, the controller 154 executes the program for the wide-angle. If the motor 24 were rotated in the reverse direction, the arm 72 would be in contact with the side 68b of the cut 68, and the lens stop position would be different from zooming direction to zooming direction due to the rotation area. Thus, the program continues to drive the motor 24 for the wide-angle at the zooming operation, and it temporarily stops the motor 24 when the brush 136 arrives at the next signal part 148. Then, the program drives the motor 24 for the telephoto until the brush 136 arrives at the signal part 148. Therefore, the arm 72 is in contact with the side 68a regardless of the zooming direction, and the lens stop position is the same.

Figure 10:
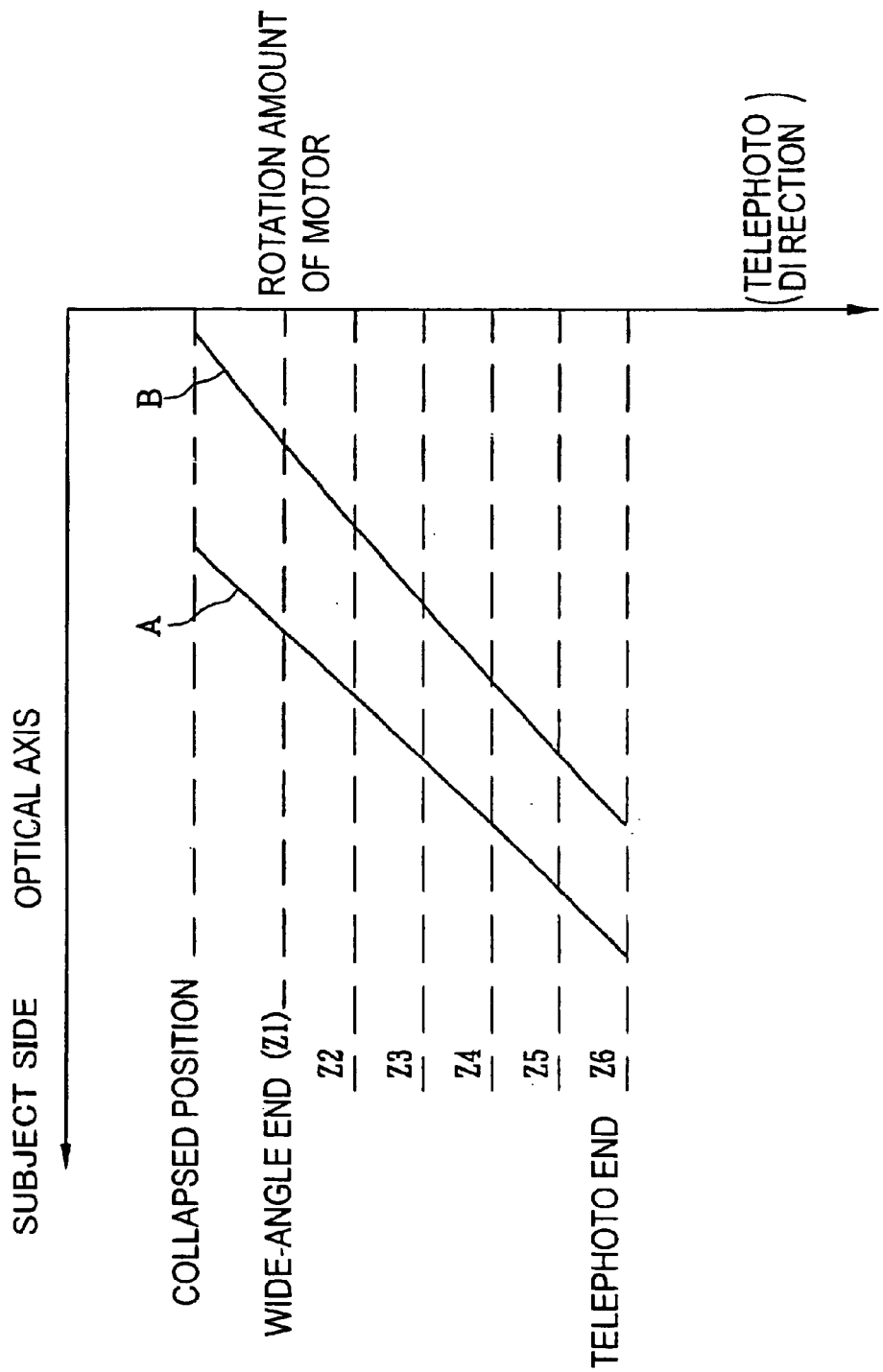
FIG. 10 is a graph diagram showing loci of a front lens group and a back lens group at zooming.

FIG. 10 shows relations between the rotation amount of the motor 24 and the moving amounts of the front lens group 26 and the back lens group 28 along the optical axis P. The front lens group 26 moves along a straight line A, and the back lens group 28 moves along a curved line B. For a normal shooting, the lens groups 26 and 28 stop at one of the zooming steps Z1–Z6 except the zooming step Z5 for the macro shooting. The number of zooming steps is not limited.

When the user half pushes the shutter release button 172, the controller 154 activates the photometry mechanism 168 and the focusing mechanism 166, and the subject brightness and subject distance are recorded in the RAM 164. When the user fully pushes the shutter release button 172, the controller 154 executes the program for the focusing. The program reads the current signals A and B, and determines whether to monitor the signal A or the signal B.

After that, the controller 154 drives the motor 24 for the telephoto until it detects a rise of the signal A or B, and it drives the motor 24 with a predetermined number of pulses in the same direction before stopping the motor 24. Since the arm 72 is in contact with the side 68a after the zooming, when the motor 24 is driven for the telephoto at the focusing, the rotation force is immediately transmitted to the cam barrel 16 so that the brush 136a leaves the signal part 148. At this time, a rise of the signal is inputted to the controller 154, and stops the motor 24 after driving it with a predetermined number or pulses in the same direction. This rotates the brush 136a by a predetermined angle in the direction denoted by the arrow in FIG. 5 from the signal part 148, and the arm 72 comes in contact with the side 68a.

Then, the controller 154 reads the subject distance and reads the motor driving pulses from the RAM 164 according to the zooming position and the subject distance. After that, the controller 154 drives the motor 24 to rotate the rotatable barrel 20 within the rotation area for the wide-angle, and counts the pulses obtained from the rotary encoder 156. When the number of the pules reaches the number of the motor driving pulses, the controller 154 stops the motor 24. Since the rotatable barrel 20 rotates within the rotation area during the focusing, the arm 72 is in contact with none of the sides 68a and 68b. The brush 136a is off the signal part 148 in the telephoto direction.

Figure 11:
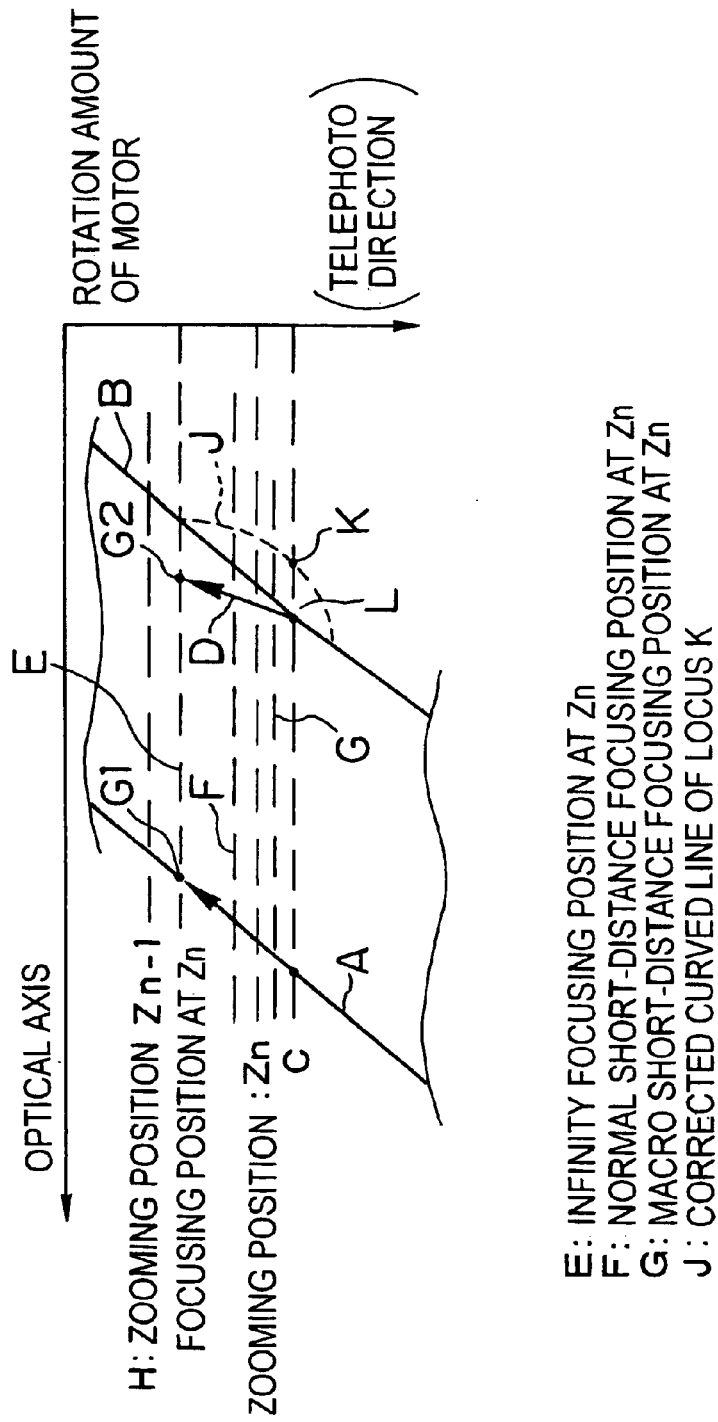
FIG. 11 is a graph diagram showing loci of the lens groups at focusing.

During the focusing, the motor 24 is driven to rotate the rotatable barrel 20 beyond the rotation area in the telephoto direction and then driven to rotate it within the rotation area in the wide-angle direction. As shown in FIG. 11, the front lens group 26 and the back lens group 28 move to positions on a dotted line C from the zooming position Zn along the loci A and B, respectively, when the motor 24 is driven to rotate the rotatable barrel 20 in the telephoto direction, and then the rotatable barrel 20 rotates within the rotation area in the wide-angle direction. Thus, the front lens group 26 moves to a position G1 along the locus A, and the back lens group 28 moves to a position G2 along a locus D of the rotatable barrel 20 (not the locus B of the rotatable barrel 20 and the cam barrel 16). Therefore, the distance between the front lens group 26 and the back lens group 28 at the focusing is different from that at the zooming. The focusing is performed from a close range to infinity.

Suppose that the front lens group 26 and the back lens group 28 are at the positions G1 and G2 on a dotted line E. If the subject distance is the normal close-range, the lens groups 26 and 28 are at positions on a dotted line F. If the subject distance is a macro close-range that is shorter than the normal close-range, the lens groups 26 and 28 are at positions on a dotted line G. This makes the distance between the lens groups 26 and 28 longer.

The distance between the lens groups 26 and 28 in case of the macro close-range needs to be longer than that in case of the normal close-range, but the distance can be unsecured due to a start position L of the locus D. In this case, the cam slits 56 can be partially changed as shown by a dotted curved line J to change the start position of the locus D to a position K in order to shift the entire lens device 10 at the zooming step Z5 to the close-range side. The focusing may be performed from infinity to the close range.

The exposure program is executed after the focusing program. In the program, the controller 154 controls the shutter according to the subject brightness and the sensitivity of the film.

The controller 154 reads the opening and closing times of the sectors 78 and 80 from the ROM 162 according to the zooming position and the subject brightness, and records them in the RAM 164. Then, the controller 154 starts sending an electric current to the solenoid 82, and stops it a predetermined time later.

Figure 12:
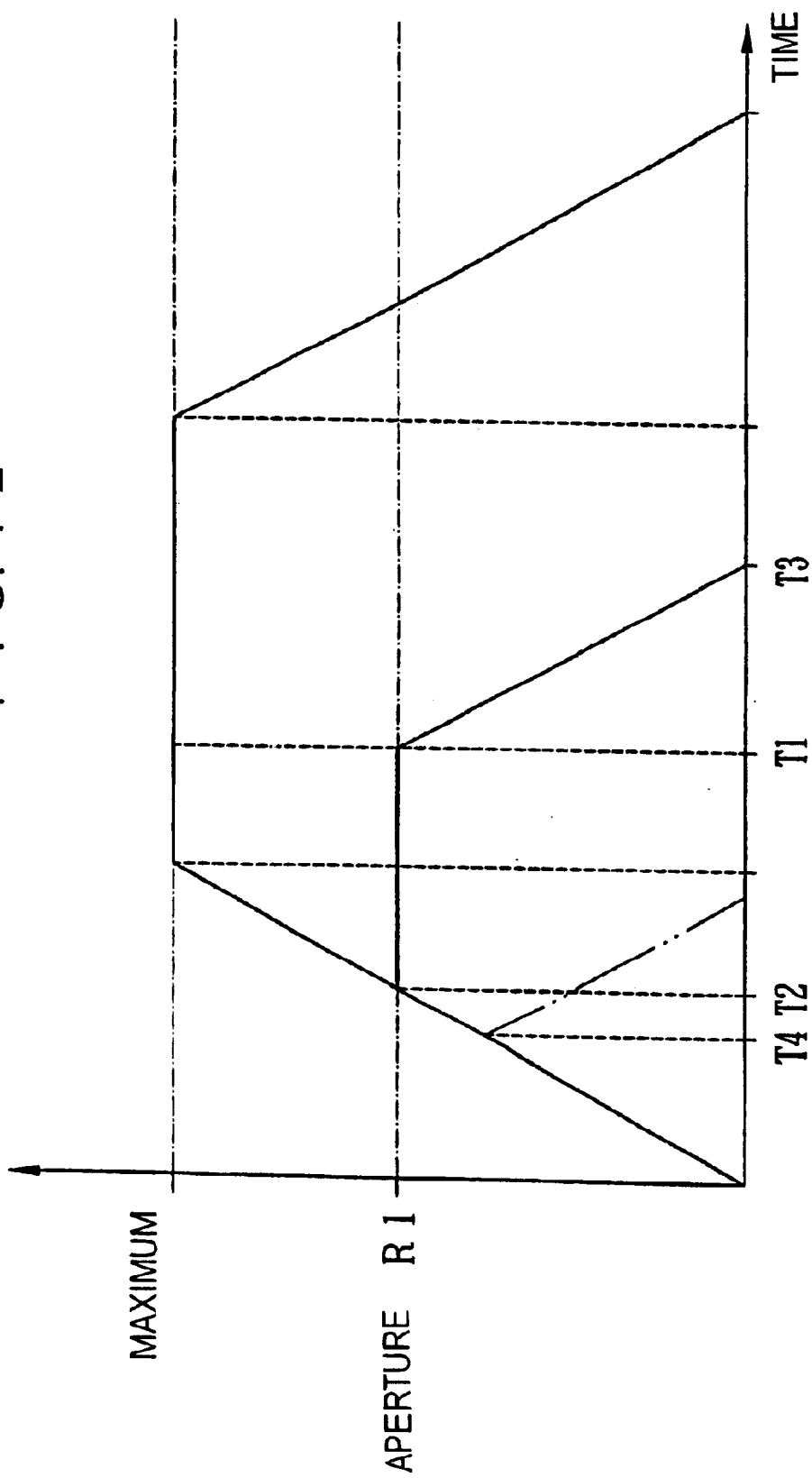
FIG. 12 is a graph diagram showing a opening and closing of sectors.

As shown in FIG. 12, the maximum aperture when the lens device 10 is at the wide-angle end is R1, and an opening and closing time of the sectors 78 and 80 according to the zooming position and the subject brightness is T1. The aperture becomes the maximum aperture R1 at a time T2. At this time, the contact 79 of the sector 78 comes in contact with the lever part 116 to keep the maximum aperture R1.

The controller 154 stops sending the electric current to the solenoid 82 at the time T1. The spring 108 pushes the core 83, which pushes the lever 100 to start closing the sectors 78 and 80. The sectors are completely closed at a time T3, and the area of a trapezoid with the original, the intersection of an R1 line and a T2 line, the intersection of an R1 line and a T4 line, and a T3 point on the time axis is the exposure.

In case the subject brightness is high, the controller 154 may start closing the sectors 78 and 80 at a time T4 before the aperture reaches the maximum aperture R1.

As shown in FIG. 8, the maximum aperture of the sectors 78 and 80 becomes larger as the lens device 10 moves from the wide-angle end to the telephoto end, except the zooming step Z5 at which the aperture is the smallest.

The zooming step Z5 is used only when the user selects the macro shooting mode for obtaining a close-up of the subject.

This makes the field depth large, and thus the lenses do not have to be precisely controlled. Therefore, the macro shooting can be performed without making the lens device 10 larger and more expensive.

Since the macro shooting is performed with the large field depth, the lens device 10 can be focused on a depth-of-field subject. The automatic focus does not have to be precisely performed, and the electronic flash light does not have to be adjusted. Thus, the exposure is appropriate even if the electronic flash fully emits the light.

Also, since the zooming step Z5 for the macro shooting is close to the telephoto side in which the view angle changes largely than in the wide-angle side, the user does not realize the change of the view angle due to the zooming step Z5 at the normal shooting.

In case of a zoom lens device with a high zooming ratio of three or higher, the aperture restricting member 84 needs to be provided. Since the aperture restricting member 84 has a function for making the aperture small in the macro shooting mode, the zoom lens device can reduce the number of parts, and can be smaller and less expensive.

In case of high-sensitivity film (for example, ISO 800 or higher), the zooming step Z5 can be used even in the normal shooting. In this case, the high-sensitivity film and the small aperture enable a well-balanced shooting.

The one motor 24 is used for both the zooming and the focusing, but one driving source may be provided for each of them.

Another embodiment will now be explained.

Figure 13:
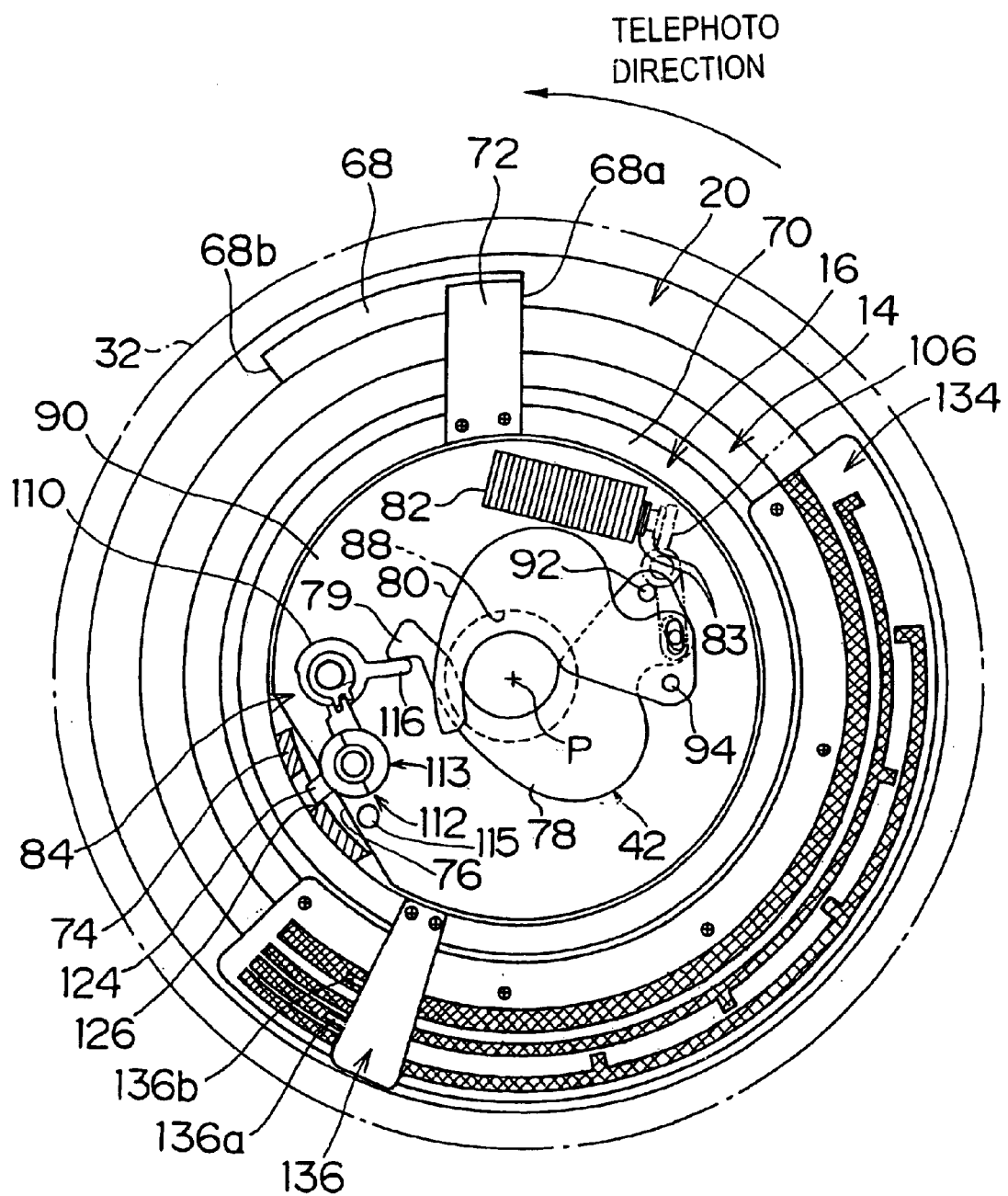
FIG. 13 is an explanatory view showing the relation between the cut and the arm and a relation between conductor patterns and the slider.

In FIG. 13, as one of the sides 68a and 68b of the cut 68 pushes the arm 72, the cam barrel 16 is rotated with respect to the guide barrel 14 by the rotatable barrel 20. The side 68a pushes the arm 72 when the rotatable barrel 20 rotates for the telephoto, and the side 68b pushes the arm 72 when the rotatable barrel 20 rotates for wide-angle. The lens frame 18 supports the back lens group 28.

During the zooming, since the cam barrel 16 rotates with the rotatable barrel 20, the front lens group 26 is moved along the optical axis P by the rotatable barrel 20 and the movable barrel 12, and the back lens group 28 is moved along the optical axis P by the rotatable barrel 20 and the cam slits 56. During the focusing, since the cam barrel 16 does not rotate, the front lens group 26 is moved along the optical axis P by the rotatable barrel 20 and the movable barrel 12, and the back lens group 28 is moved along the optical axis P by the rotatable barrel 20.

A cam plate 274 (a cam member) is attached to the inner periphery of the guide barrel 14 which moves along the optical axis P with the rotatable barrel 20 during the zooming. The cam plate 74 is moved within the cut 76 (see FIG. 2) formed outside the lens shutter 42 by the guide barrel 14.

Figure 14:
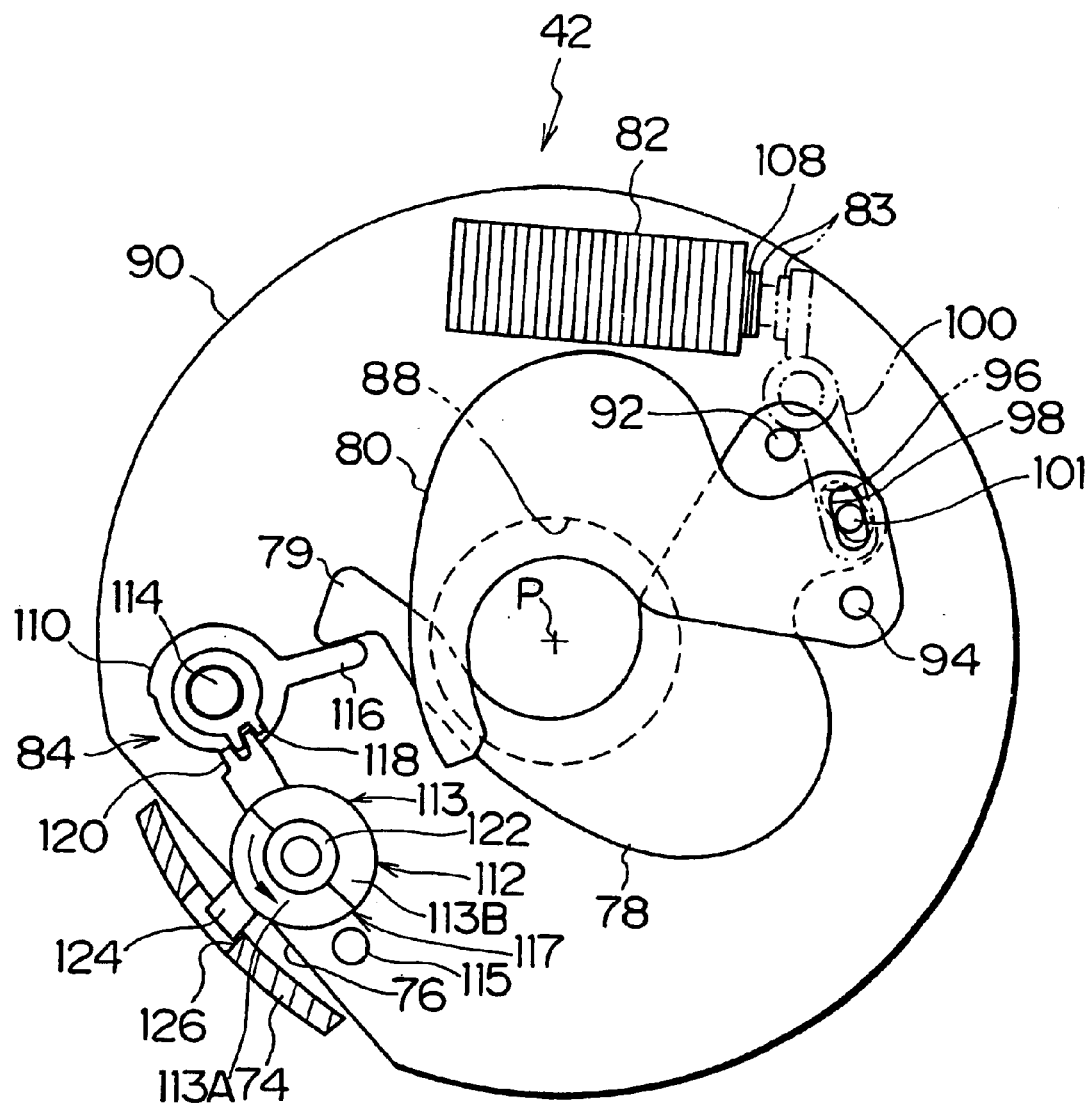
FIG. 14 is a view showing a lens shutter.

As shown in FIG. 14, the lens shutter 42 has the two sectors 78 and 80, the direct-acting solenoid 82, the aperture restricting member 84 coupled with the cam plate 274, and so on. These are attached to the shutter plate 90 with the shutter opening 88. The cam plate 274 and the aperture restricting member 84 compose the aperture restricting device.

Figure 15:
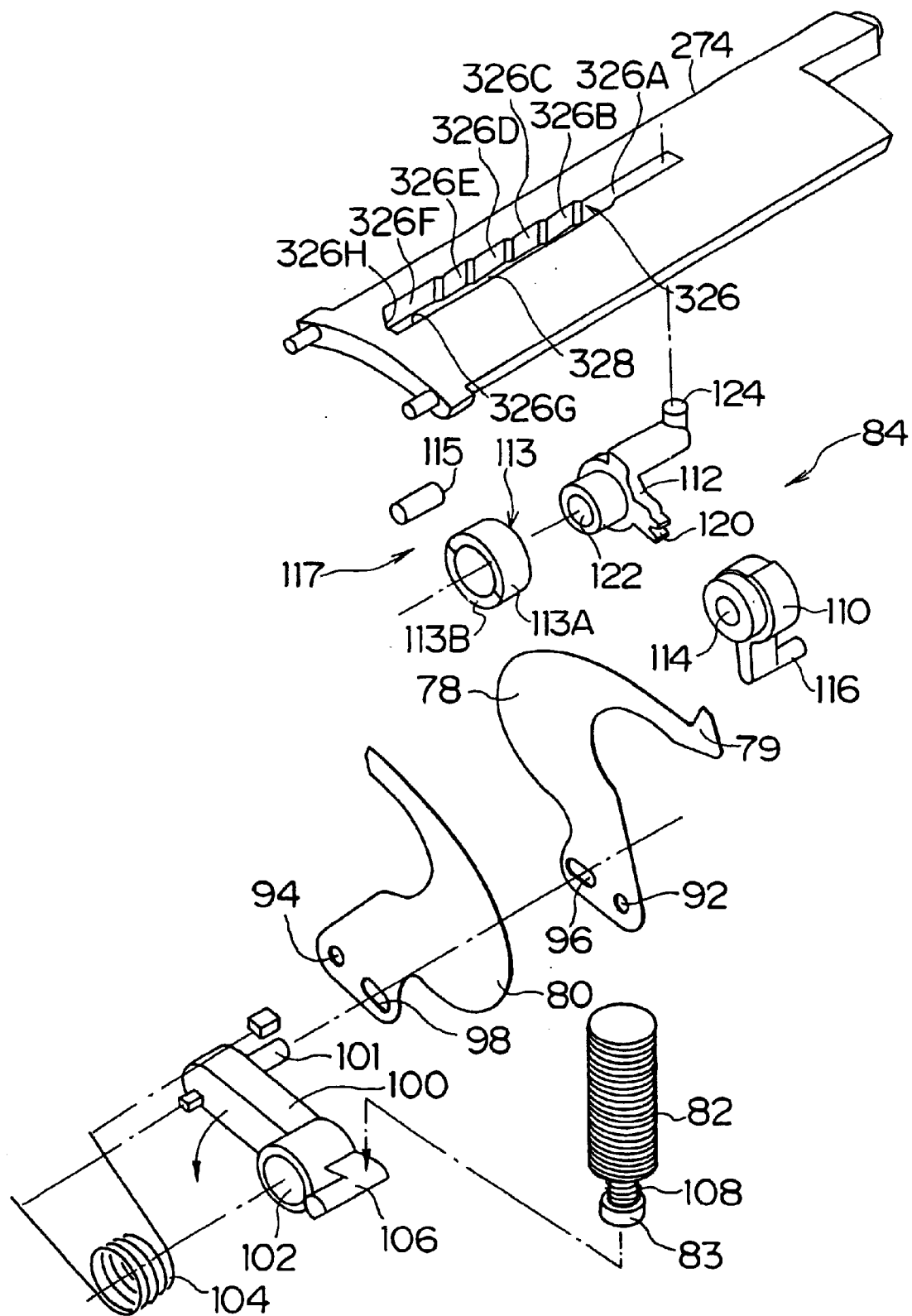
FIG. 15 is disassembly perspective view of the lens shutter.

The sectors 78 and 80 are rotatably supported by the shutter plate 90 through the holes 92 and 94. The slots 96 and 98 are formed in the sectors 78 and 80 near the holes 92 and 94, respectively, as shown in FIG. 15, and the pin 101 of the lever 100 is coupled with the slots 96 and 98. The lever 100 is rotatably supported by the shutter plate 90 through the shaft 102, and is pushed counterclockwise in FIG. 15 about the shaft 102 by the spring 104 hooked on the lever 100 and the shutter plate 90. When the lever 100 is rotated counterclockwise, the sectors 78 and 80 rotates from closed positions for closing the shutter opening 88 (see FIG. 14) to open positions about the holes 92 and 94 by being pushed by the pin 101. This opens the lens shutter 42. A contact 106 is formed on the other side of the shaft 102 of the lever 100 as shown in FIG. 15, and the core 83 is in contact with the contact 106. The core 83 is pushed downward in FIG. 15 by the spring 108 between the solenoid 82 and the core 83 to push the contact 106. This restricts the rotation of the lever 100, and thus keeps the sectors 78 and 80 at the closed positions. The solenoid 82, the core 83 and the spring 108 compose a plunger. When the current flows to the solenoid 82, the core 83 moves to the left in FIG. 14 to enter the cylinder-shaped solenoid 82. This relieves the sectors 78 and 80 of the restriction so that they rotate toward the open positions to positions corresponding to the maximum aperture.

The aperture restricting member 84 limits the aperture with the cam plate 274, and it is composed of the restriction lever 110 and the cam lever 112.

The restriction lever 110 is rotatably supported by the shutter plate 90 through the shaft 114, and it has the lever part 116 that is in contact with the contact 79 at the end of the sector 78. This restricts the rotation of the sector 78 and the rotation of the lever 100, and thus restricts the rotation of the sector 80. The aperture is limited in this way.

The restriction lever 110 also has the gear part 118 as shown in FIG. 14, and the gear part 118 is engaged with the gear part 120 of the cam lever 112 which is rotatably supported by the shutter plate 90 through the shaft 122.

A toggle mechanism 117 pushes the cam lever 112 counterclockwise in FIG. 14 through the restriction lever 110, and thus the cam pin (a cam follower) 124 of the cam lever 112 pushes a cam surface (a first cam surface) 326 of the cam plate 274. Thus, when the cam pin 124 moves with respect to the cam surface 326, the cam lever 112 and the restriction lever 110 are rotated to move the lever part 116. This changes the maximum aperture.

As shown in FIG. 15, the toggle mechanism 117 is composed of a cylindrical permanent magnet 113 and a core 115. The permanent magnet 113 is fixed to the shaft 122 of the cam lever 112, and divided into an S pole 113A and an N pole 113B. The core 115 is fixed to the shutter plate 90, and provided close to the permanent magnet 113.

If the S pole 113A is closer to the core 115 than the N pole 113B as shown in FIG. 14, the cam lever 112 is rotated counterclockwise in FIG. 14 by a magnetic field formed between the S pole 113A and the core 115. This pushes the cam pin 124 against the cam surface 326 of the cam plate 274.

Figure 16:
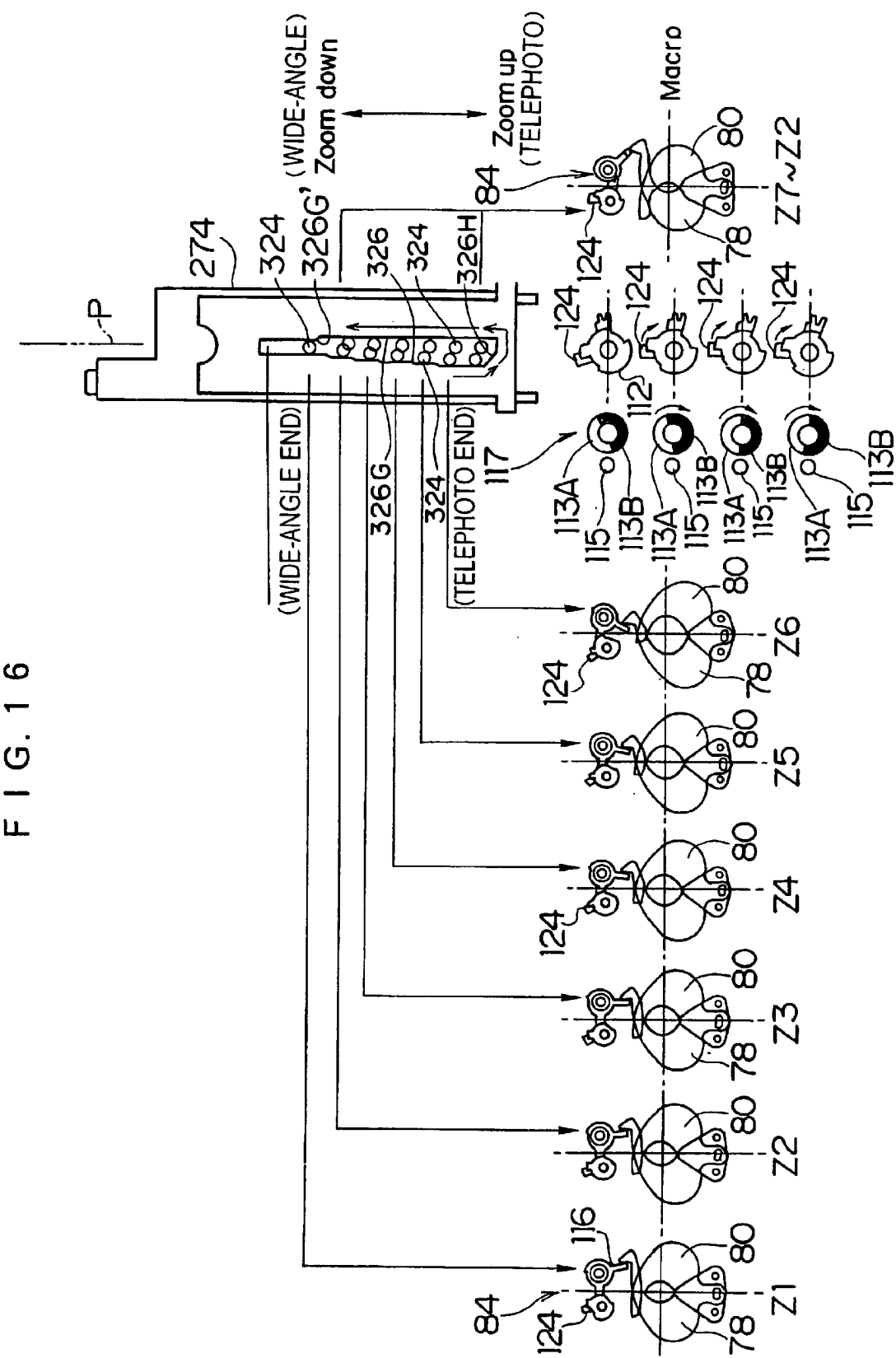
FIG. 16 is an explanatory diagram showing apertures at zooming steps.

On the other hand, if the cam pin 124 is moved along a cam surface (a third cam surface) 326H (if the movable barrel 12 (see FIG. 4) is moved forward beyond the telephoto end), the cam lever 112 is rotated clockwise in FIG. 16 against the magnetic field. When the N pole 113B gets closer to the core 115 than the S pole 113A, the cam lever 112 is rotated clockwise in FIG. 16 by a magnetic field formed between the N pole 1133B and the core 115. This pushes the cam pin 124 against a cam surface 326G (a second cam surface) of the cam plate 274. At this time, the aperture of the sectors 78 and 80 is smaller than that for the normal shooting. The toggle mechanism does not always have to have the magnet, and it may have a spring or the like.

As shown in FIG. 13, the cam plate 274 is fixed to the guide barrel 14 so that it moves in the cut 76 in the cam barrel 16. The cam pin 124 is coupled with the cam surface 326 when the zoom lens device 10 is within the range between the collapsed position and the telephoto end as shown in FIG. 16. When the user selects the macro shooting mode, the movable barrel 12 (see FIG. 4) is moved forward beyond the telephoto end, and the cam pin 124 is coupled with the cam surface 326G facing the cam surface 326.

The cam surface 326 is formed on one side of a cam slit 328 along the optical axis P, and is composed of cam surfaces 326A, 326B, 326C, 326D, 326E and 326F corresponding to six zooming steps Z1 (the wide-angle end), Z2, Z3, Z4, Z5 and Z6 (the telephoto end). The cam surface 326G connects with the cam surface 326F through the cam surface 326H.

The cam surfaces 326A–326F push the cam pin 124 more softly from the cam surface 326A to the cam surface 326F. Thus, the maximum aperture becomes larger as the zoom lens device 10 moves from a wide-angle end to a telephoto end.

The maximum aperture for the macro shooting (the cam surface 326G) is smaller than those for the normal shooting (the cam surfaces 326A–326F), and thus a field depth for the macro shooting is larger than those for the normal shooting. Since the cam surface 326G faces the cam surfaces 326B–326F corresponding to the zooming steps Z2–Z6, the macro shooting can be easily performed at the zooming steps Z2–Z6.

When zooming step Z2 is switched to the zooming step Z1, the cam pin 124 gets coupled with the cam surface 326A through a cam surface 326G' (a fourth cam surface). The toggle mechanism 117 operates in the opposite way from that shown in FIG. 16 to push the cam pin 124 against the cam surface 326. The toggle mechanism 117 relieves the cam pin 124 from the coupling with the cam surface 326G. This switches the macro shooting mode to the normal shooting mode when the zoom lens is moved beyond either the telephoto end or the wide-angle end. The toggle mechanism 117, the cam surface 326G and the cam pin 124 comprises an aperture switching device (117; 326G; 124).

If the cam surface 326G faces the cam surfaces 326A–326F, the macro shooting can be easily performed at all the zooming steps Z1–Z6. This makes the field depth large at all the zooming steps Z1–Z6, and the lens device 10 can be focused on a depth-of-field subject. Therefore, the macro shooting can be easily performed. In addition, since the aperture is small at the macro shooting, the exposure is appropriate even if the electronic flash fully emits the light, and the electronic flash light does not have to be adjusted.

Figure 17:
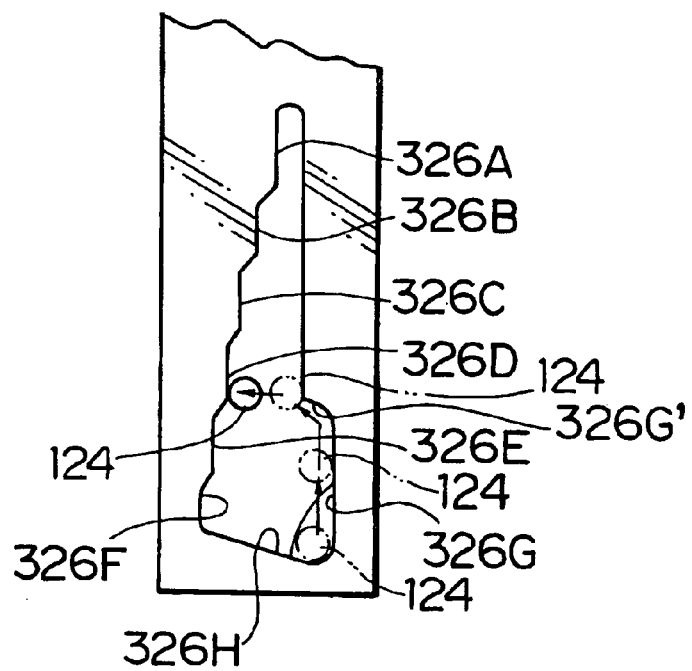
FIG. 17 is a plan view showing a second embodiment of a cam surface of a cam plate.

As shown in FIG. 17, if the cam surface 326G faces the cam surfaces 326D–326F, when the zooming step Z6 is switched to the zooming step Z4, the cam pin 124 gets coupled with the cam surface 326D through the cam surface 326G'. Thus, the macro shooting mode can be switched to the normal shooting mode without the zooming step Z1 or Z2.

Figure 18:
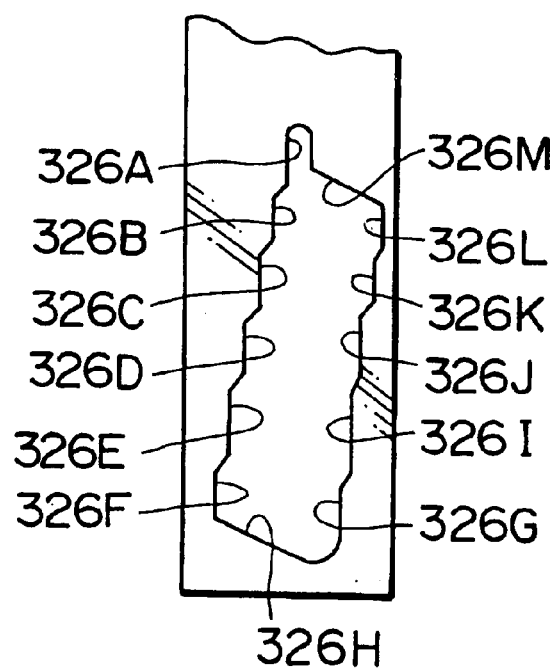
FIG. 18 is a plan view showing a third embodiment of the cam surface of the cam plate.

As shown in FIG. 18, if the cam surface 326G faces the cam surface 326F and cam surfaces 326I, 326J, 326K and 326L face the cam surfaces 326E, 326D, 326C and 326B, respectively, when the zooming step Z2 is switched to the zooming step Z1, the cam pin 124 gets coupled with the cam surface 326A through a cam surface 326M. Thus, the macro shooting mode can be switched to the normal shooting mode.

As shown in FIG. 13, the pattern member 134 is attached to the back end of the guide barrel 14, and the slider 136 is attached to the back end 70 of the cam barrel 16. The slider 136 has the two brushes 136a and 136b that slide along the pattern member 134 as shown in FIG. 19. The pattern member 134 has the ground pattern 140, the first pattern 142, the second pattern 144 and the collapsed position pattern 146. The brushes 136a and 136b are electrically connected. The ground pattern 140 is grounded, and is ark-shaped so that the brush 136b slides along it when cam barrel 16 rotates while the zoom lens device 10 is within the range between the collapsed position and the telephoto end. Predetermined voltages are applied to the first pattern 142 and the second pattern 144 from the signal detecting part 150, and signal parts 148 are provided at positions where the brush 136a is at the zooming steps Z1–Z6. The second, fourth and sixth (even-numbered) signal parts 148 are provided on the first pattern 142, and the first, third and fifth (odd-numbered) signal parts 148 are provided on the second pattern 144.

The brush 136a is on the sixth signal part 148 in FIG. 19 when the lens device 10 is at the telephoto end. If the user chooses the macro shooting mode, the cam barrel 16 further rotates in the telephoto direction. When the signal detecting part 150 detects a macro switching pattern 149, the motor 24 rotates the cam barrel 16 reversely until the signal detecting part 150 detects the sixth signal part 148. Before the change of the rotation direction, the cam pin 124 is moved from the cam surface 326F to the cam surface 326G to switch the normal shooting mode to the macro shooting mode. The lens device 10 does not need to be set at the zooming step Z6 in the macro shooting mode, and it may be set at the same zooming step as that at the change of the mode.

The aperture at the zooming step Z6 in the macro shooting mode is smaller than those at the zooming steps Z1–Z6 in the normal shooting mode as shown in FIG. 16, and thus the field depth at the zooming step Z6 in the macro shooting mode is larger.

The collapsed position pattern 146 in FIG. 19 itself is a signal part. When the zoom lens device 10 is at the collapsed position, the brush 136a is on it, and the collapsed position pattern 146 outputs a "0" (low level) signal to the signal detecting part 150. When the brush 136a is not on it, it outputs a "1" (high level) signal.

Also, when the brush 136a is on one of the even-numbered signal parts 148, the first pattern 142 outputs a "0" (low level) signal to the signal detecting part 150; and when the brush 136a is on none of the three parts 148, the first pattern 142 outputs a "1" (high level) signal. When the brush 136a is on one of the odd-numbered signal parts 148, the second pattern 144 outputs a "0" (low level) signal to the signal detecting part 150; and when the brush 136a is on none of the three parts 148, the second pattern 144 outputs a "1" (high level) signal. The signal outputted from the first pattern 142 is called a signal A, and the signal outputted from the second pattern 144 is called a signal B, and the signal outputted from the collapsed position pattern 146 is a signal Hp. The change of each signal from the high level to the low level is called a fall, and the opposite change is called a rise.

The signal detecting part 150 outputs the signals A, B and Hp to the controller 154 connected to the motor 24 for the zooming through the driver 158. The rotary encoder 156 is provided on the output shaft of the motor 24, and the rotary encoder 156 determines a rotation angle of the motor 24 and feeds it back to the controller 154, which controls the motor 24 according to the rotation angle.

The controller 154 drives the motor 24 in response to an operation of the zoom button of the zoom control part 159. The zoom button is composed of the telephoto button for moving the zoom lens device 10 toward the telephoto end and the wide-angle button for moving it toward the wide-angle end.

The controller 154 is connected to the ROM 162, the RAM 164, the macro button 152 and so on. The ROM 162 records opening and closing times of the sectors 78 and 80 and the moving amount of the front lens group 26 for each combination of the zooming position and the subject brightness, and the programs for controlling the camera. The RAM 164 temporarily records the subject distance obtained from the focusing mechanism 166, the subject brightness obtained from the photometry mechanism 168, the opening and closing times of the sectors 78 and 80 read from the ROM 162, and so on.

The programs include the zooming program for moving the zoom lens device 10 to the zooming position according to zooming operation, the focusing program for moving it from the zooming position to the focusing position after the shutter release, the returning program for returning it to the zooming position after the exposure, the error correction program for detecting that the cam barrel 16 has made an error of rotation angle and returning the zoom lens device 10 to the zooming position in case of the error, and the macro program for moving the zoom lens device 10 to a macro switching position beyond the telephoto end when the macro shooting is selected with the macro button 152.

The controller 154 detects the falls of the signals A and B at the zooming to determine which of the zooming steps Z1–Z6 the zooming position is. The zooming position is rewritten in the RAM 164 each time it is changed.

The zooming program has a flow for each of the two cases; a case in which the signal part 148 corresponding to the previous zooming position is even-numbered (the signal A) and a case in which it is odd-numbered (the signal B).

The focusing program has a flow for each of the two cases; a case in which the signal part 148 corresponding to the current zooming position is even-numbered (the signal A) and a case in which it is odd-numbered (the signal B).

Since the brush 136a is not on the zooming signal part 148 of the first or second pattern 142 or 144 after the focusing, the returning program returns the brush 136a to the signal part 148. The returning program has a flow for each of the two cases; a case in which the signal part 148 is even-numbered (the signal A) and a case in which it is odd-numbered (the signal B).

The error correction program is executed every predetermined time while operations such as the zooming, the focusing, the exposure and the film feeding are not being performed. During that time, the brush 136a is on none of the signal parts 148. The cam barrel 16 can make an error of rotation angle due to disturbance.

Therefore, the program reads the signals A and B to determine whether the cam barrel 16 has made the error. If so, the program drives the motor 24 to return the brush 136a to the zooming signal part 148. The program has a flow for each of the two cases; a case in which the zooming signal part 148 is even-numbered (the signal A) and a case in which it is odd-numbered (the signal B).

The macro program controls the motor 24 to rotate the cam barrel 16 in the same direction from the telephoto end position so that the brush 136a is on the sixth signal part 148.

The controller 154 controls the motor 24 so that the zoom lens device 10 moves from the collapsed position to the wide-angle position in response to a turning-ON of the power switch 170. The controller 154 stops the motor 24 when it detects a fall of the signal A. At this time, the brush 136a is on the first signal part 148 of the second pattern 144, and the arm 72 is in contact with the side 68a of the cut 68 of the rotatable barrel 20 as shown in FIG. 13.

Since the position of the lens at a zooming position differs from direction to direction of the lens movement due to the rotation angle, the program makes the arm 72 be in contact with the side 68a of the cut 68 when the brush 136a is on a signal part 148 of the first pattern 142 or the second pattern 144.

Since the moving amounts of the lens groups 26 and 28 differ from zooming position to zooming position at the focusing even if the subject distance is the same, motor driving pulses corresponding a lens moving amount for each subject distance is stored in the ROM 162. The motor driving pulses rotates the cam barrel 16 within the rotation area.

The operation of the zoom lens device 10 will now be explained with reference to the figures.

The zoom lens device 10 is initially at the collapsed position as shown in FIG. 2, and the brush 136a is on the collapsed position pattern 146. The user does not take a picture while the zoom lens device 10 moves from the collapsed position to the wide-angle position. The cam surface 326A corresponding to the period is flat as shown in FIG. 16.

The controller 154 controls the motor 24 in response to a turning-ON of the power switch 170. The driving force of the motor 24 is transmitted to the rotatable barrel 20, which is moved along the optical axis P with respect to the fixed barrel 22 by the threads 30 and 36. Then, the movable barrel 12 is moved along the optical axis P with respect to the rotatable barrel 20 by the threads 38 and 40. This moves the front lens group 26 along the optical axis P.

The guide barrel 14, the cam barrel 16 and the lens frame 18 move along the optical axis P with the rotatable barrel 20. The rotation force of the rotatable barrel 20 is transmitted to the cam barrel 16 as the side 68a pushes the arm 72. The lens frame 18 is moved along the optical axis P with respect to the rotatable barrel 20 by the cam slits 56 as the cam barrel 16 rotates in the rotatable barrel 20. This changes the distance between the front lens group 26 and the back lens group 28.

The rotation of the cam barrel 16 slides the slider 136 along the ground pattern 140 and the signal parts 148 provided on the guide barrel 14. The controller 154 stops the motor 24 when it detects the first fall of the signal B. At this time, the brush 136a is on the first signal part 148 of the second pattern 144, and the controller 154 determines that the lens device 10 is at the wide-angle end and records the information in the RAM 164. This makes it possible to cancel a zooming operation toward the wide-angle end since the lens device 10 is already at the wide-angle end.

During the zooming toward the wide-angle end, the cam pin 124 of the aperture restricting member 84 slides along the cam surface 326. The cam pin 124 is on the cam surface 326A when the lens device 10 is at the wide-angle end.

If a zooming operation toward the telephoto end is performed after the power is turned ON, the controller 154 executes the program for the telephoto.

Each time the brush 136a passes one of the signal parts 148 for the zooming steps Z2–Z6, the controller 154 detects a fall and a rise of the signal A or B and rewrites the information stored in the RAM 164. Thus, in response to an operation of the zoom control part 159, the controller 154 reads the information on the zooming step stored in the RAM 164 and determines whether to monitor the signal A or the signal B according to the number of the signal part 148 corresponding to the zooming step.

In case of the zooming step Z2, the controller 154 stops the motor 24 when it detects a fall of the signal B. At this time, the brush 136a is on the signal part Z3 of the second pattern 144, and the arm 72 is in contact with the side 68a of the cut 68.

If a zooming operation toward the wide-angle end is performed, the controller 154 executes the program for the wide-angle. If the motor 24 were rotated in the reverse direction, the arm 72 would be in contact with the side 68b of the cut 68, and the lens stop position would be different from zooming direction to zooming direction due to the rotation area. Thus, the program continues to drive the motor 24 for the wide-angle at the zooming operation, and it temporarily stops the motor 24 when the brush 136 arrives at the next signal part 148. Then, the program drives the motor 24 for the telephoto until the brush 136 arrives at the signal part 148. Therefore, the arm 72 is in contact with the side 68a regardless of the zooming direction, and the lens stop position is the same.

Figure 20:
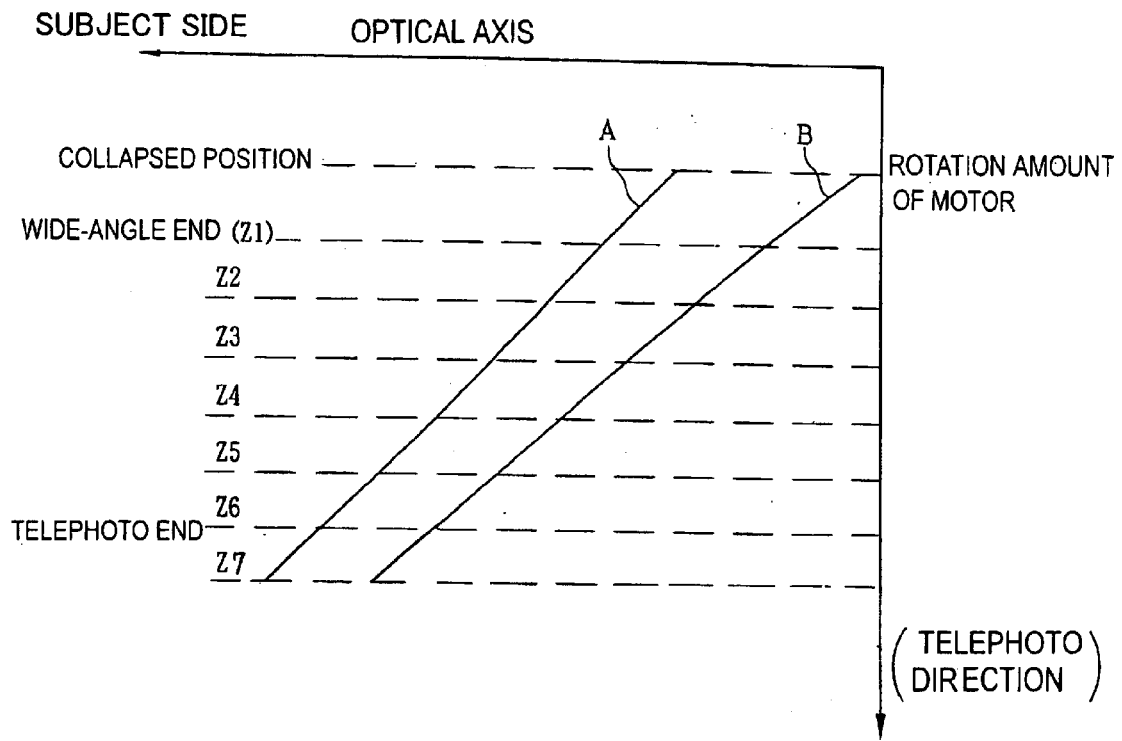
FIG. 20 is a graph diagram showing loci of a front lens group and a back lens group at zooming.

FIG. 20 shows relations between the rotation amount of the motor 24 and the moving amounts of the front lens group 26 and the back lens group 28 along the optical axis P. The front lens group 26 moves along a straight line A, and the back lens group 28 moves along a curved line B. For a normal shooting, the lens groups 26 and 28 stop at one of the zooming steps Z1–Z6. The number of zooming steps is not limited.

When the user half pushes the shutter release button 172, the controller 154 activates the photometry mechanism 168 and the focusing mechanism 166, and the subject brightness and subject distance are recorded in the RAM 164. When the user fully pushes the shutter release button 172, the controller 154 executes the program for the focusing. The program reads the current signals A and B, and determines whether to monitor the signal A or the signal B.

After that, the controller 154 drives the motor 24 for the telephoto until it detects a rise of the signal A or B, and it drives the motor 24 with a predetermined number of pulses in the same direction before stopping the motor 24. Since the arm 72 is in contact with the side 68a after the zooming, when the motor 24 is driven for the telephoto at the focusing, the rotation force is immediately transmitted to the cam barrel 16 so that the brush 136a leaves the signal part 148. At this time, a rise of the signal is inputted to the controller 154, and stops the motor 24 after driving it with a predetermined number or pulses in the same direction. This rotates the brush 136a by a predetermined angle in the direction denoted by the arrow in FIG. 13 from the signal part 148, and the arm 72 comes in contact with the side 68a.

Then, the controller 154 reads the subject distance and reads the motor driving pulses from the RAM 164 according to the zooming position and the subject distance. After that, the controller 154 drives the motor 24 to rotate the rotatable barrel 20 within the rotation area for the wide-angle, and counts the pulses obtained from the rotary encoder 156. When the number of the pules reaches the number of the motor driving pulses, the controller 154 stops the motor 24. Since the rotatable barrel 20 rotates within the rotation area during the focusing, the arm 72 is in contact with none of the sides 68a and 68b. The brush 136a is off the signal part 148 in the telephoto direction.

Figure 21:
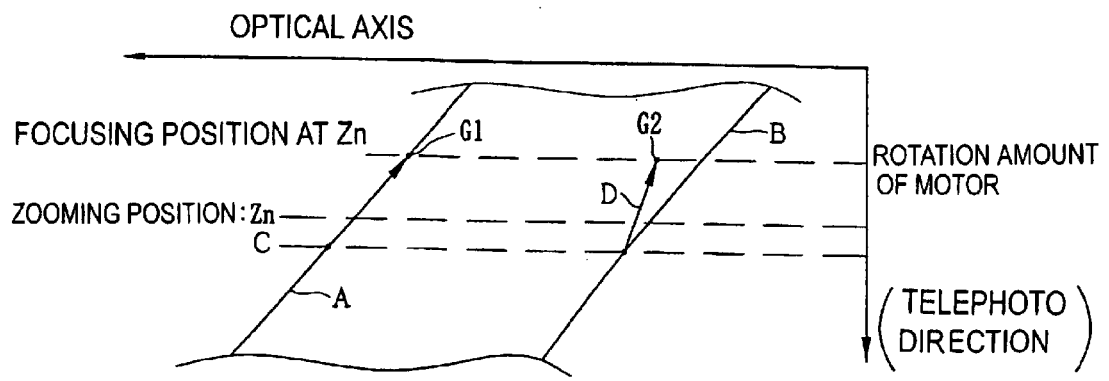
FIG. 21 is a graph diagram showing loci of the lens groups at focusing.

During the focusing, the motor 24 is driven to rotate the rotatable barrel 20 beyond the rotation area in the telephoto direction and then driven to rotate it within the rotation area in the wide-angle direction. As shown in FIG. 21, the front lens group 26 and the back lens group 28 move to positions on a dotted line C from the zooming position Zn along the loci A and B, respectively, when the motor 24 is driven to rotate the rotatable barrel 20 in the telephoto direction, and then the rotatable barrel 20 rotates within the rotation area in the wide-angle direction. Thus, the front lens group 26 moves to a position G1 along the locus A, and the back lens group 28 moves to a position G2 along a locus D of the rotatable barrel 20 (not the locus B of the rotatable barrel 20 and the cam barrel 16). Therefore, the distance between the front lens group 26 and the back lens group 28 at the focusing is different from that at the zooming. The focusing is performed from a close range (1 m) to infinity. The focusing may be performed from infinity to the close range.

The exposure program is executed after the focusing program. In the program, the controller 154 controls the shutter according to the subject brightness and the sensitivity of the film.

The controller 154 reads the opening and closing times of the sectors 78 and 80 from the ROM 162 according to the zooming position and the subject brightness, and records them in the RAM 164. Then, the controller 154 starts sending an electric current to the solenoid 82, and stops it a predetermined time later.

As shown in FIG. 12, the maximum aperture when the lens device 10 is at the wide-angle end is R1, and an opening and closing time of the sectors 78 and 80 according to the zooming position and the subject brightness is T1. The aperture becomes the maximum aperture R1 at a time T2. At this time, the contact 79 of the sector 78 comes in contact with the lever part 116 to keep the maximum aperture R1.

The controller 154 stops sending the electric current to the solenoid 82 at the time T1. The spring 108 pushes the core 83, which pushes the lever 100 to start closing the sectors 78 and 80. The sectors are completely closed at a time T3, and the area of a trapezoid with the original, the intersection of an R1 line and a T2 line, the intersection of an R1 line and a T4 line, and a T3 point on the time axis is the exposure.

In case the subject brightness is high, the controller 154 may start closing the sectors 78 and 80 at a time T4 before the aperture reaches the maximum aperture R1.

As shown in FIG. 16, the maximum aperture of the sectors 78 and 80 becomes larger as the lens device 10 moves from the wide-angle end to the telephoto end. In the macro shooting mode, the toggle mechanism 117 pushes the cam pin 124 against the cam surface 326F for the macro shooting to minimize the aperture.

If the user turns on the macro shooting mode with the macro button 152, the zoom lens device 10 is moved to the macro switching position beyond the telephoto end. This switches the normal shooting mode to the macro shooting mode in which the aperture is limited. Also, the user can perform the macro shooting at a desired zooming step by selecting it with the zoom control part 159. Thus, the user can perform the macro shooting only by moving the zoom lens device 10 beyond the telephoto end.

When the user turns off the macro shooting mode with the macro button 152, the zoom lens device 10 temporarily returns to the wide-angle end and the macro shooting mode is switched to the normal shooting mode. Then, the lens device 10 is set at the same zooming step as that at the turning-OFF of the macro shooting mode.

Since the lens device 10 performs the macro shooting with the small aperture, the exposure is appropriate even if the electronic flash fully emits the light. Thus, the electronic flash light does not have to be adjusted.

In the case of a zoom lens device with a high zooming ratio of three or higher, the aperture restricting member 84 needs to be provided. Since the aperture restricting member 84 has the aperture switching device (117; 326G; 124) for making the aperture small in the macro shooting mode, the zoom lens device can reduce the number of parts, and can be smaller and less expensive.

In case the lens device 10 is at the wide-angle end in FIG. 4, the normal shooting mode is switched to the macro shooting mode when the lens device 10 is moved to a predetermined position beyond the wide-angle end.

As set forth herein above, the aperture at the predetermined zooming step that is between the telephoto end and the wide-angle end is smaller than apertures at the other zooming steps, and the predetermined zooming step is used only when the macro shooting mode is chosen. Therefore, the lens does not have to be precisely controlled, and the simple lens device can perform the macro shooting.

Moreover, since the predetermined zooming step is close to the telephoto side in which the view angle changes largely than in the wide-angle side, the user does not realize the change of the view angle at the normal shooting.

Furthermore, since the aperture restricting member makes the aperture small at the short-distance shooting, the shutter speed can be controlled separately from the aperture according to the natural light, and the background as well as the main subject come out well.

As set forth hereinabove, when the zoom lens is moved beyond the telephoto end or the wide-angle end, the aperture of the sectors becomes small and the field depth becomes large. Therefore, the lens device can be focused on the depth-of-field subject, and the simple lens device can easily perform the macro shooting.

It should be understood, however, that there is no intention to limit the invention to the specific forms disclosed, but on the contrary, the invention is to cover all modifications, alternate constructions and equivalents coming within the spirit and scope of the invention as expressed in the appended claims.

What is claimed is:

1. A zoom lens device comprising an aperture at a predetermined zooming step that is between a telephoto end and a wide-angle end, and a macro shooting button, wherein the aperture is smaller at the predetermined zooming step than at other zooming steps, and wherein the predetermined zooming step is used only when a macro shooting mode for obtaining a close-up of a subject is chosen by activating the macro shooting button.

2. The zoom lens device as defined in claim 1, wherein there are a plurality of zooming steps and an aperture is changed according to a zooming step.

3. The zoom lens device as defined in claim 1, wherein the predetermined zooming step is closer to the telephoto end than the wide-angle end.

4. A zoom lens device comprising:

a zoom lens with a plurality of zooming steps;

means for choosing a macro shooting mode for obtaining a close-up of a subject;

means for moving the zoom lens to a predetermined zooming step that is between a telephoto end and a wide-angle end when the choosing means chooses the macro shooting mode; and means for changing an aperture according to the zooming steps so that when the aperture is at the predetermined zooming step that is between a telephoto end and a wide-angle end, the aperture is smaller than when the aperture is at the other zooming steps.

5. A zoom lens device, comprising:

a zoom lens with a plurality of zooming steps;

a choosing device that chooses a macro shooting mode for obtaining a close-up of a subject;

a driving device that moves the zoom lens to a predetermined zooming step that is between a telephoto end and a wide-angle end when the choosing device chooses the macro shooting mode; and an aperture restricting device that changes an aperture according to the zooming steps so that when the aperture is at the predetermined zooming step that is between the telephoto end and the wide-angle end, the aperture is smaller than when the aperture is at the other zooming steps.

6. A zoom lens device, comprising:

a zoom lens;

sectors operative to form an aperture; and an aperture switching device that switches a size of the aperture of the sectors when the zoom lens is moved beyond one of a telephoto end and a wide-angle end, wherein the aperture switching device is used only when a macro shooting mode for obtaining a close-up of a subject is chosen.

* * * * *